United States Patent [19]

Andoh et al.

[11] Patent Number: 5,568,765
[45] Date of Patent: Oct. 29, 1996

[54] MICROWAVE FRYER

[75] Inventors: Yuzi Andoh, Yamatokoriyama; Masaki Katabe, Fujiidera; Hiromi Suenaga, Osaka, all of Japan

[73] Assignee: Sharp Kabushiki Kaisha, Osaka, Japan

[21] Appl. No.: 463,243

[22] Filed: Jun. 5, 1995

[30] Foreign Application Priority Data

| Sep. 28, 1994 | [JP] | Japan | 6-232652 |
| Nov. 22, 1994 | [JP] | Japan | 6-287644 |
| Dec. 27, 1994 | [JP] | Japan | 6-326101 |
| Apr. 3, 1995 | [JP] | Japan | 7-077799 |

[51] Int. Cl.$^6$ ............................................. A47J 37/12
[52] U.S. Cl. .................. 99/403; 99/329 R,410; 99/451; 99/DIG. 14; 219/731
[58] Field of Search .................... 99/403, 404, 410, 99/411, 412, 413, 414, 415, 451, DIG. 14, 327, 328, 329 R, 330, 331, 333, 329 P; 219/679, 687, 719, 720, 731

[56] References Cited

U.S. PATENT DOCUMENTS

| 2,585,103 | 1/1952 | Fitzgerald | 99/451 |
| 2,772,626 | 12/1956 | Shaw | 99/403 |
| 2,997,566 | 8/1961 | Pierce et al. | 99/DIG. 14 |
| 3,633,490 | 1/1972 | Schiffmann | 99/DIG. 14 |
| 4,437,159 | 3/1984 | Waugh . | |
| 4,580,024 | 4/1986 | Thomas | 99/DIG. 14 |
| 4,593,170 | 6/1986 | Maeda et al. | 99/403 |
| 4,708,878 | 11/1987 | Hagelauer et al. | 99/451 |
| 5,090,305 | 2/1992 | Lehman | 99/403 |
| 5,333,539 | 8/1994 | Hurley et al. | 99/451 |
| 5,352,866 | 10/1994 | Cartwright et al. | 99/403 |
| 5,363,749 | 11/1994 | Hurley et al. | 99/DIG. 14 |

FOREIGN PATENT DOCUMENTS

| 147875 | 7/1985 | European Pat. Off. | 99/403 |
| 149856 | 7/1985 | European Pat. Off. | 99/403 |
| 263084 | 4/1988 | European Pat. Off. | 99/403 |
| 57-54127 | 11/1982 | Japan . | |
| 136321 | 8/1983 | Japan . | |
| 59-62024 | 4/1984 | Japan . | |
| 60-28494 | 7/1985 | Japan . | |
| 62-32926 | 2/1987 | Japan . | |
| 1-26689 | 5/1989 | Japan . | |
| 2-147031 | 6/1990 | Japan . | |
| 2-60323 | 12/1990 | Japan . | |
| 4-20310 | 1/1992 | Japan . | |
| 5-25487 | 4/1993 | Japan . | |
| 2115260 | 9/1983 | United Kingdom . | |
| 9003121 | 4/1990 | WIPO | 99/451 |
| 9410889 | 5/1994 | WIPO | 99/403 |

*Primary Examiner*—David Scherbel
*Assistant Examiner*—Tony G. Soohoo

[57] ABSTRACT

A microwave fryer includes a magnetron in the machine body; an oil vessel for storing oil to be heated by radiation of microwaves from the magnetron which is detachably disposed in a heating chamber of the machine body; and a detachable frying container, provided over the oil vessel in the heating chamber, having a screen portion which allows microwaves to pass therethrough when the container is immersed in the oil and which prohibits almost all microwaves from passing therethrough when the container is in the air. The frying container has a top opening which is sealed against microwaves. The apparatus further includes a lifting mechanism for moving one of the frying container and the oil vessel relative to the other, and a temperature detecting device for detecting the temperature of the cooking oil. In this arrangement, the oil held in the oil vessel detachably disposed in the heating chamber is heated by radiation of microwaves. The frying container is immersed into the oil in the oil vessel by moving one of the oil vessel and the frying container relative to the other, in order to fry foodstuffs. The microwave fryer further includes a determining device for judging the appropriateness of the amount of oil, a temperature detecting device for detecting a real temperature of oil and a preventing device for preventing the user from forgetting the use of the apparatus.

28 Claims, 15 Drawing Sheets

MICROWAVE FRYER

BACKGROUND OF THE INVENTION (1) Field of the Invention

The present invention relates to a microwave fryer using radiated energy of microwaves, and particularly to a microwave fryer in which oil in and oil vessel, detachably provided in a heating chamber, is heated by microwaves. More specifically, the present invention is directed to a microwave fryer which is capable of distinguishing the propriety of the quantity of oil held in an oil vessel, or prevents the user from forgetting the use and forgetting to turn it off as well as to effect automatic cooking, and which has a temperature detector detecting a real temperature of the cooking oil.

(2) Description of the Prior Art

Japanese Patent Publication Hei-1 No.26,689 has disclosed a fryer.

This conventional fryer has a heating chamber in the main apparatus body, an oil vessel storing oil beneath the heating chamber with a zigzag heater near the bottom of the oil vessel and a microwave generator generating microwaves in the main apparatus body.

Provided in the heating chamber is a basket-like container holding foodstuffs, which can be moved up and down by a lifting mechanism.

Another conventional fryer has been disclosed in Japanese Patent Application Laid-Open Sho-59 No. 62,024.

This fryer comprises a sheathed heater for heating oil inside a heating chamber in the main body. Oil in the heating chamber is circulated between the heating chamber and an oil vessel provided separately from the heating chamber by means of a circulating pump. A microwave Generator is provided which impresses microwaves to foodstuffs held in the oil vessel as well as the oil circulated inside the oil vessel by the circulating pump.

Since the conventional fryer has the sheathed heater for heating the oil inside the oil vessel, it suffers from a performance problem that the oil is subject to deteriorate due to the contact of the oil with the sheathed heater at high-temperatures. Further, it is difficult to clean the oil vessel since the sheathed heater is disposed in the oil vessel.

In the aforementioned fryer disclosed in Japanese Patent Publication Hei-1 No. 26,689, there is a fear that, if microwaves are applied from the microwave generator when the basket-like container holding some foodstuffs is stationed at an upper position by the lifting mechanism, the foodstuffs are directly heated by the microwaves and cooked before being cooked by the oil.

The fryers described hereinabove effect an automatic frying operation, but the fryer of this kind cannot effect satisfactory frying if the oil is low in quantity and little in depth. On the contrary, if the oil it too large in quantity and great in depth, the oil runs over the top. Japanese Patent Publication Sho-60 No. 28,494 discloses a fryer in which a pair of temperature detectors for monitoring oil-temperatures are provided inside an oil vessel in order to detect the oil quantity inside the oil vessel based on the temperature difference between the temperatures detected by the two temperature detectors.

The oil vessel is fixed in any of the aforementioned fryers and it is impossible to apply the oil level detecting device disclosed in Japanese Patent Publication Sho-60 No. 28,494 stated above to a fryer having a detachable oil vessel. The necessity of two temperature detectors in the oil level detecting device also presents a disadvantage in cost.

In order to bring the aforementioned fryer into market and obtain certain consumer needs, it is preferable to distribute it as a multi-functional product having functions such as rice cooking and team cooking functions, other than the frying function. To meet this demand, it is necessary to propose an oil vessel detaching structure which facilitates an oil vessel easily replaced with a water vessel by anyone.

In order to avoid the problem of oil scattering at times of putting in or taking out foodstuffs, it is preferable for a home-use fryer to have such a structure disclosed as in Japanese Patent Application Laid-Open Sho-59 No. 62,024, that is, the structure in which the cooked stuff inside the oil vessel is fried with heat from the heated oil supplied and with heat generated by microwaves. The fryer disclosed in Japanese Patent Application Laid- Open Sho-59 No. 62,024, however, requires an oil vessel independent from the heating chamber and therefore not only becomes bulky but also requires a circulating pump for circulating the oil as well as circulating paths for the oil, becoming complicated in the whole structure.

In order to take measures against a case where the user goes away from the site without cutting the power supply after heating is started, another conventional fryer is disclosed in Japanese Patent Application Laid-Open Hei-4 No. 20,310, which, for example, has a device for monitoring the temperature of oil with a thermosensitive element and automatically shutting down the power supply to stop heating if any sharp lowering of the temperature of oil is not detected within a predetermined period of time.

As to the automation of cooking fried foods, there have been a lot of methods disclosed in which heating time is controlled in accordance with Variations of the oil temperature during cooking from a preset temperature in order to regulate the cooking of the resulting foodstuffs (for instance, Japanese Patent Publication Hei-5 No. 25,487, Japanese Patent Publication Sho-57 No. 54,127, Japanese Patent Application Laid-Open Sho-62 No. 32,926 etc.).

Since the prior art fryers of this kind use heaters and the like as a heating source, it is possible to regulate the oil temperature all the time and the user can monitor the used condition by checking the variation of the oil temperature. On the other hand, the high-frequency wave fryer utilizing high-frequency wave heating must necessarily be operated with its the heating chamber closed and with the door closed during heating. Conversely, when the door is open, the apparatus must stop heating. Accordingly, if the user goes away from the site leaving the door open for example, the temperature of oil lowers. In this situation, if the frying operation is started, the cooking of foods could be degraded.

In the conventional automatic fryer, a standard quantity of heat to be imparted to a predetermined quantity of foodstuffs is set up in advance and heating time is adjusted in order to compensate variations of heating quantity due to the varying oil temperature. This method is effective when an approximate amount of foodstuffs to be cooked is decided. In home use, however, the amount of foodstuffs to be cooked at the same time varies largely. Therefore, recognition of the amount of foodstuffs has a great influence on the cooking of the food. That is, in some cases, the estimate of the standard quantity of heat itself may pose a problem in determining a proper heating-time.

On the other hand, as to the fryer for frying foodstuffs, Japanese Patent Publication Hei-2 No. 60,323 discloses a fryer in which two different heating sources are provided in order to shorten the frying time. More specifically, a heater is provided which directly heats the cooking oil to allow the oil to braise the food from the outside while a high-frequency (microwave) heating device excites the inside of foodstuffs. That is, in general, the dielectric loss of foodstuffs is so great as compared to that of oils that when microwaves are applied to a system where foodstuffs and oil coexist, energy of microwaves is largely absorbed by the foodstuffs. Thus the foodstuffs are heated from the inside with the microwaves as well as braised in oil from the outside. The conventional temperature detector Used for detecting the temperature of oil is merely composed of a bar-shaped thermosensitive element such as a thermistor etc., covered with a metallic protecting tube. This protecting tube is provided in order to protect the thermosensitive element from the cooking oil as well as to accelerate the response of the sensor to changes in temperature.

However, since the conventional fryer has the two different heat sources, i.e., of radiation of microwaves and of conduction of heat generated by a gas burner, a heater or the like, the apparatus becomes large-scale, posing demerits such as high-cost for private use and taking up much room for installation. The temperature detector provided in the conventional fryer is designed considering only the protection against the cooking oil and the responding performance to changes in temperature. That is, since the conventional temperature detector is of a metallic bar as stated above, if this temperature detector is applied to a fryer in which cooking oil is heated by only radiation of microwaves, high-frequency electric fields concentrate on the tip of the temperature detector whereby the temperature detector itself is heated, thereby making it difficult to measure the real oil-temperature.

SUMMARY OF THE INVENTION

The microwave fryer of the present invention has been provided in view of the above problems and it is therefore a first object of the present invention to provide a microwave fryer in which foodstuffs are cooked by heating oil held in an oil vessel detachably disposed in a heating chamber and lifting the oil vessel or a frying container up and down with a lifting device to immerse the frying container into the oil in the oil vessel.

It is a second object of the present invention to provide an oil-quantity detecting device which is low in cost and applicable to a microwave fryer with an oil vessel detachable there from.

It is a third object of the present invention to provide a microwave fryer which, in order to simplify the structure of the apparatus, has a microwave-heating device as a sole heating source and further includes a temperature detector capable of detecting an actual oil-temperature in good response without being affected by the localized heat generated by radiation of microwave s.

It is a fourth object of the present invention to provide a microwave fryer which can reliably avoid problems caused by the user's forgetting the use of the apparatus or by user's forgetting to turn off the apparatus and is able to automatically correct the cooking time in accordance with the amount of foodstuffs when an automatic frying operation is performed.

The above objects can be attained by the apparatus of the present invention having features as follows:

In accordance with a first configuration of the present invention, a microwave fryer includes: a heating chamber for heat-cooking foodstuffs; an oil vessel disposed inside the heating chamber for holding cooking oil; a frying container disposed in the heating chamber for holding foodstuffs; a door which can be opened and closed to cover an opening portion of the heating chamber; a lifting means for moving the frying container of the oil vessel up and down; a microwave-heating means for heating the cooking oil in the oil vessel with radiation of microwaves; and a temperature detecting means for detecting the temperature of the cooking oil.

A second aspect of the present invention resides in the microwave fryer according to the first configuration wherein the frying container is detachably disposed in the upper part of the oil vessel in the heating chamber, has a screen portion which allows microwaves to transmit therethrough when the container is in the oil and prohibits most of microwaves to transmit therethrough when the container is in the air and has a top opening sealed against electromagnetic waves.

A third aspect of the present invention resides in the microwave fryer according to the first configuration wherein the top opening of the frying container is sealed against electromagnetic waves by elevating the frying container close to the ceiling of the heating chamber by means of the lifting means.

In accordance with a fourth configuration of the present invention, a microwave fryer includes: a heating chamber for heat-cooking foodstuffs an oil vessel disposed inside the heating chamber for holding a cooking oil; a frying container disposed in the heating chamber for holding foodstuffs; a door which can be opened and closed to cover an opening portion of the heating chamber; a lifting means for moving the frying container or the oil vessel up and down; a microwave-heating means for heating the cooking oil in the oil vessel with radiation of microwaves; a temperature detecting means for detecting the temperature of the cooking oil; a movement control means for moving the oil vessel or the frying container by a predetermined length in a direction so as to immerse the frying container into the cooking oil, after a predetermined heating operation is effected when the frying container is placed in a standard position where the frying container is not immersed in the oil vessel; a temperature detecting portion disposed such that the way of change of the positional relation of the temperature detecting portion to the oil due to the movement of the oil vessel or the frying container by the predetermined length becomes different depending on whether the quantity of oil is acceptable or not; and a determining means for determining whether the quantity of oil is acceptable based on the relation between a temperature detected at the standard position after the heating operation and a temperature detected after the oil vessel or the frying container is moved by the predetermined length.

A fifth aspect of the present invention resides in the microwave fryer according to the fourth configuration which further comprises a heating-device controlling means for lowering or halting the output from the heating means from the detection of temperature by the temperature detecting portion at the standard position until the detection of temperature after the movement of the predetermined length.

A sixth aspect of the present invention resides in the microwave fryer according to the fourth configuration which further comprises a means for halting the operation and/or warning the fact based on a detected signal indicating inappropriateness from the determining means when the determining means determines that the quantity of oil in the oil vessel is unacceptable.

In accordance with a seventh configuration of the present invention, a microwave fryer includes: a heating chamber for heat-cooking foodstuffs; an oil vessel disposed inside the heating chamber for holding a cooking oil; a frying container disposed in the heating chamber for holding foodstuffs; a door which can be opened and closed to cover an opening portion of the heating chamber; a lifting means for moving the frying container or the oil vessel up and down; a microwave-heating means for heating the cooking oil in the oil vessel with radiation of microwaves; a temperature detecting means for detecting the temperature of the cooking oil; and a controller for controlling the microwave-heating means so that the temperature detected by the temperature detecting means may fall within a predetermined range of temperatures and constructed such that the temperature detecting means comprises: a thermosensitive element; a first protecting tube made of metal for covering the thermosensitive element; and a second protecting tube made of metal for covering the first protecting tube and has an opening at a front end wherein the second protecting tube is disposed in such a manner that the front end thereof is at least flush with or projected out of the front end of the first protecting tube.

An eighth aspect of the present invention resides in the microwave fryer according to the seventh configuration wherein the side surface of the second protecting tube is perforated with a plurality of small holes.

A ninth aspect of the present invention resides in the microwave fryer according to the seventh configuration wherein the second protecting tube is made electrically equipotential with the first protecting tube.

A tenth aspect of the present invention resides in the microwave fryer according to the eighth configuration wherein the second protecting tube is made electrically equipotential with the first protecting tube.

In accordance with an eleventh configuration of the present invention, a microwave fryer comprises: a heating chamber for heat-cooking foodstuffs; an oil vessel disposed inside the heating chamber for holding a cooking oil; a frying container disposed in the heating chamber for holding foodstuffs; a door which can be opened and closed to cover an opening portion of the heating chamber; a door opening/closing detecting means for detecting door-opening and closing; a microwave-heating means for heating the cooking oil in the oil vessel with radiation of microwaves; a temperature detecting means for detecting the temperature of the cooking oil; a controller receiving an electric signal as to a temperature detected by the temperature detecting means and controlling the microwave-heating means based on the input signal; a lifting means for moving the oil vessel up and down; and an oil vessel position detecting means for detecting upper and lowered positions of the oil vessel, and is constructed such that at the beginning of heating, the oil vessel is stationed in the lowered position so that foodstuffs held in the frying container are kept away from the cooking oil in the oil vessel; and when the temperature detecting means detects that the temperature of the cooking oil has reached a previously designated temperature and delivers the detected result to the controller, the controller activates the lifting means to drive the oil vessel to the upper position and controls the microwave-heating means to maintain the cooking oil in the oil vessel at the preset temperature.

In accordance with a twelfth configuration of the present invention, a microwave fryer comprises: a heating chamber for heat-cooking foodstuffs; an oil vessel disposed inside the heating chamber for holding a cooking oil; a frying container disposed in the heating chamber for holding foodstuffs; a door which can be opened and closed to cover an opening portion of the heating chamber; a door opening/closing detecting means for detecting door-opening and closing; a microwave-heating means for heating the cooking oil in the oil vessel with radiation of microwaves; a temperature detecting means for detecting the temperature of the cooking oil; a controller receiving an electric signal as to a temperature detected by the temperature detecting means and controlling the microwave-heating means based on the input signal; a lifting means for moving the oil vessel up and down; and an oil vessel position detecting means for detecting upper and lowered positions of the oil vessel, and is constructed such that immediately after the oil vessel position detecting means detects that the oil vessel has reached the upper position and outputs the detected result to the controller, the controller starts to measure time; when the door opening/closing detecting means detects that the door has not been opened before a preset first time $t_1$ and outputs the detected result to the controller, the controller informs the user of the fact that the door has not been opened by way of an informing means; and when the door opening/closing detecting means detects that the door has not been opened before a preset second time $t_2$ ($t_2 > t_1$) and outputs the detected result to the controller, the controller instructs the microwave-heating means to stop heating.

In accordance with a thirteenth configuration of the present invention, a microwave fryer comprises: a heating chamber for heat-cooking foodstuffs an oil vessel disposed inside the heating chamber for holding a cooking oil; a frying container disposed in the heating chamber for holding foodstuffs; a door which can be opened and closed to cover an opening portion of the heating chamber; a door opening/closing detecting means for detecting door-opening and closing; a microwave-heating means for heating the cooking oil in the oil vessel with radiation of microwaves; a temperature detecting means for detecting the temperature of the cooking oil; a controller receiving an electric signal as to a temperature detected by the temperature detecting means and controlling the microwave-heating means based on the input signal; a lifting means for moving the oil vessel up and down; and an oil vessel position detecting means for detecting upper and lowered positions of the oil vessel, and is constructed such that immediately after the door opening/closing detecting means detects that the door is opened and outputs the detected result to the controller, the controller starts to measure time; and when the door opening/closing detecting means detects that the door has not been closed before a preset third time $t_3$ and outputs the detected result to the controller, the controller informs the user of the fact that the door has not been closed by way of an informing means; and when the door opening/closing detecting means detects that the door has not been closed before a preset fourth time $t_4$ ($t_4 > t_3$) and outputs the detected result to the controller, the controller instructs the lifting means to drive the oil vessel to the lowered position.

In accordance with a fourteen configuration of the present invention, a microwave fryer comprises: a heating chamber for heat-cooking foodstuffs; an oil vessel disposed inside the heating chamber for holding a cooking oil; a frying container disposed in the heating chamber for holding foodstuffs; a door which can be opened and closed to cover an opening portion of the heating chamber; a door opening/closing detecting means for detecting door-opening and closing; a microwave-heating means for heating the cooking oil in the oil vessel with radiation of microwaves; a temperature detecting means for detecting the temperature of the cooking oil; a controller receiving an electric signal as to a temperature detected by the temperature detecting means and controlling the microwave-heating means based on the input signal; a lifting means for moving the oil vessel up and down; and an oil-vessel position detecting means for detecting upper and lowered positions of the oil vessel, and is constructed such that when the door opening/closing detecting means detects that the door is opened and outputs the detected result to the controller, the controller instructs the microwave-heating means to stop heating; and when the temperature detecting means detects that the temperature of the cooking oil is lowered to a preset first temperature $T_1$ and outputs the detected result to the controller, the controller informs the user of the temperature lowering by way of an informing means; and when the temperature detecting means detects that the temperature of the cooking oil is lowered to a preset second temperature $T_2$ ($T_2 \leq T_1$) and outputs the detected result to the controller, the controller instructs the lifting means to drive the oil vessel to the lowered position.

A fifteenth aspect of the present invention resides in the microwave fryer according to the fourteenth configuration wherein the temperature detecting means detects the temperature of the cooking oil and outputs the detected signal to the controller; the controller calculates an inclination of temperature lowering of the cooking oil based on the received signal from the temperature detecting means and when the controller determines that the calculated inclination of temperature lowering is greater than a preset inclination of temperature lowering; the controller instructs the lifting means to maintain the oil vessel in the upper position, neither informing the user nor driving the oil vessel to the lowered position.

In accordance with a sixteenth configuration of the present invention, a microwave fryer comprises: a heating chamber for heat-cooking foodstuffs an oil vessel disposed inside the heating chamber for holding a cooking oil; a frying container disposed in the heating chamber for holding foodstuffs; a door which can be opened and closed to cover an opening portion of the heating chamber; a door opening/closing detecting means for detecting door-opening and closing; a microwave-heating means for heating the cooking oil in the oil vessel with radiation of microwaves; a temperature detecting means for detecting the temperature of the cooking oil; a controller receiving an electric signal as to a temperature detected by the temperature detecting means and controlling the microwave-heating means based on the input signal; a lifting means for moving the oil vessel up and down; an oil vessel position detecting means for detecting upper and lowered positions of the oil vessel; a plurality of keys for selecting an item from a menu and instructing the apparatus to start heating; and a displaying portion for displaying a selected item from the menu, a heating time and the like, and is constructed such that when the user selects an item from the menu via the keys, the controller, in association with the selected item, sets up a cooking temperature $T_m$, a basic heating time $t_m$ and a heating-time increment unit $t_u$; at the beginning of heating the oil vessel is stationed in the lowered position so that foodstuffs held in the frying container are kept away from the cooking oil held in the oil vessel and when the temperature detecting means detects that the temperature of the cooking oil has reached the cooking temperature $T_m$ and outputs the detected result to the controller, the controller activates the lifting means to move the oil vessel to the upper position, controls the microwave-heating means to maintain the cooking oil at the cooking temperature $T_m$ and calculates an oil-temperature variation dT using a formula as follows:

$$dT = T_{max} - T$$

where $T_{max}$ indicates a maximum temperature detected after the start of frying and T indicates a temperature of the cooking oil detected during the heat-cooking; and the controller further calculates a total heating-time $t_c$ using a formula as follows:

$$t_c = t_m + t_u \cdot dT$$

to thereby control the heat-cooking operation during the calculated total heating-time $t_c$.

A seventeenth aspect of the present invention resides in the microwave fryer according to the sixteenth configuration wherein the controller measures a preheating time $t_y$ until the temperature of the cooking oil reaches the cooking temperature $T_m$ and calculates a correcting time $t_n$ using a predetermined correcting time coefficient K as follows:

$$t_n = t_y \cdot K$$

whereby the total heating-time $t_c$ is corrected by the following formula:

$$t_c = t_m + t_u \cdot dT - t_n.$$

An eighteenth aspect of the present invention resides in the microwave fryer according to the sixteenth configuration wherein the controller also sets up an upper-limit temperature $T_u$ of the oil temperature at the time of selecting an item from the menu and when the temperature detecting means detects that the oil-temperature has reached the upper-limit temperature $T_u$ after the start of heat-cooking and outputs the detected result to the controller, the controller prohibits renewal of the total heating-time $t_c$.

A nineteenth aspect of the present invention resides in the microwave fryer according to the seventeenth configuration wherein the controller also sets up an upper-limit temperature $T_u$ of the oil temperature at the time of selecting an item from the menu and when the temperature detecting means detects that the oil-temperature has reached the upper-limit temperature $T_u$ after the start of heat-cooking and outputs the detected result to the controller, the controller prohibits renewal of the total heating-time $t_c$.

A twentieth aspect of the present invention resides in the microwave fryer according to the sixteenth configuration wherein the controller also sets up a first time $t_h$ at the time of selecting an item from the menu, and when the controller recognized that a remaining time $t_z$ calculated by a subtraction of an actual heating time $t_a$ which is measured by the controller from the total heating-time $t_c$ is shorter than the first time $t_h$, the controller instructs the displaying portion to display the remaining time and prohibits renewal of the total heading-time $t_c$.

A twenty-first aspect of the present invention resides in the microwave fryer according to the seventeenth configuration wherein the controller also sets up a first time $t_h$ at the time of selecting an item from the menu, and when the controller recognized that a remaining time $t_z$ calculated by a subtraction of an actual heating time $t_a$ which is measured by the controller from the total heating-time $t_c$ is shorter than the first time $t_h$, the controller instructs the displaying portion to display the remaining time and prohibits renewal of the total heating-time $t_c$.

A twenty-second aspect of the present invention resides in the microwave fryer according to the twentieth configuration wherein the controller also sets up a second time $t_k$ at the time of selecting an item from the menu, and when the controller recognized that a remaining time $t_z$ calculated by a subtraction of an actual heating time $t_a$ which is measured by the controller from the total heating-time $t_c$ is shorter than the second time $t_k$, the controller prohibits the displaying portion from displaying the remaining time.

A twenty-third aspect of the present invention resides in the microwave fryer according to the twenty-first configuration wherein the controller also sets up a second time $t_k$ at the time of selecting an item from the menu, and when the controller recognized that a remaining time $t_z$ calculated by a subtraction of an actual heating time $ta$ which is measured by the controller from the total heating-time $t_c$ is shorter than the second time $t_k$, the controller prohibits the displaying portion from displaying the remaining time.

A twenty-fourth aspect of the present invention resides in the microwave fryer according to the sixteenth configuration wherein the controller prohibits the user from charging foodstuffs into the frying container during the preheating until the temperature of the cooking oil held in the oil vessel stationed in the lowered position reaches the cooking temperature $T_m$, and when the temperature of the cooking oil has reached the cooking temperature $T_m$, the controller permits the user to insert foodstuffs into the frying container and controls the oil vessel to be stationed in the lowered position and the microwave-heating means to maintain the cooking oil at the cooking temperature $T_m$ until the door is opened, and after the foodstuffs are inserted into the frying container and the door is closed, the controller controls the oil vessel to be stationed in the lowered position and the microwave-heating means to reenter the preheating mode.

Finally, a twenty-fifth aspect of the present invention resides in the microwave fryer according to the twenty-fourth configuration wherein the controller instructs the displaying portion to display that the apparatus is in a state allowing the user to insert foodstuffs into the frying container.

As the present invention is thus configurated as has been described, the present invention includes various operations as follows:

First, since in the first to third configurations the oil is radiated with microwaves and heated by the dielectric loss of the oil, the oil is hard to degrade because the oil does not come in contact with any high-temperature portion (such as sheathed heater). Since the oil vessel is not equipped with any heating device, it is easy to clean the oil vessel as well as to attach and detach the oil vessel. Further, foodstuffs will not be heated by direct radiation of microwaves.

In this case, by making the top opening of the frying container close to the ceiling of the heating chamber, it is possible to seal the radiation of microwaves without providing any microwave-sealing lid over the top opening of the frying container. Also, it is easily possible to realize microwave-heating to only the oil while the foodstuffs are contained in the frying container. By controlling microwave-heating with the top opening of the frying container kept away from the ceiling of the heating chamber, it is easily possible to realize preheating of foodstuffs by making use of the characteristic of microwave-heating, that is, the characteristic that radiation of microwaves is absorbed by foodstuffs containing much water and therefore those wich much water is heated intensively. Needless to say, putting foodstuffs in and out can be easily done by taking out the frying container from the heating chamber.

Only closing the lidding body for foodstuffs to be put in and out makes it possible to seal the top opening of the frying container against microwaves. Microwave-heating can be done for only the oil while foodstuffs are inserted in the frying container. It is also possible to easily preheat foodstuffs. Since foodstuffs can be put in and out by only opening the lidding body, the handling is quite easy.

In the above configuration, by fitting a spring or the like to the lifting means, it is possible to reduce the load for starting the driver motor of the lifting device and therefore a low-power driver motor can be used realizing reduced cost.

In the fourth configuration, since the oil is heated to a desired temperature so that the temperature of the oil is higher than the atmospheric temperature over the oil surface, the temperature detector detects variations in temperature as the detector is moved over a predetermined length. The variation or varying manner of the condition to which the detector is exposed becomes different depending on whether the quantity of oil is pertinent or not. Specifically, if the quantity of oil is acceptable, the variation of the detected temperatures becomes large between before and after the movement whereas if the quantity of oil is unacceptable, the variation becomes small. Therefore, from this fact, it is possible to determine whether the quantity of oil is acceptable by noticing the variation or the magnitude of the varying rate.

In this case, the predetermined heating operation indicates a heating operation for a predetermined period of time required for the oil to be elevated in temperature to a predetermined level or a heating operation required for the detecting temperature to be elevated to a predetermined temperature. The movement in a predetermined length indicates a movement by a length equivalent to a level difference between the maximum and minimum levels of an appropriate oil quantity range. The types of the variation or varying manner of the condition include three cases: 1) the temperature detector is immersed both before and after the movement; 2) the temperature detector is in the air before the movement and becomes immersed after the movement; and the temperature detector is in the air both before and after the movement. The relation between the detected temperature at the standard position and the detected temperature after the movement indicates a temperature variation (difference) or a temperature varying rate.

In the fourth configuration, the temperature detector is disposed inside the frying container but it is possible to attach the detector on the wall surface of the heating chamber. Incidentally, as for a heating device, any other heating device other than a microwave-heating device may be utilized.

As to the fifth configuration, since it takes a rather long time (a few seconds) to detect a second temperature stabilized after the movement from the first detection of temperature at the standard position, the heating power of the device during the detection is made low in order to lessen the variation of the detecting temperatures due to the heat.

In the sixth configuration, it is possible to prohibit the continuation of cooking as well as to warn the user of the situation, unless an acceptable amount of oil is led.

In accordance with the seventh feature of the invention, since the temperature detector detecting the temperature of the cooking oil in the oil vessel has a first protecting metallic tube accommodating a thermosensitive element at the front end therein and a second protecting metallic tube covering the first protecting tube, it is possible to prevent concentration of electric fields on the tip of the first protecting tube since the second protecting tube has an opening in the front end thereof, a variation of the oil-temperature cab be transferred quickly to the thermosensitive element.

In this configuration, the front end of the second protecting tube is at least flush with or projected out of the front end of the first protecting tube. Therefore this structure is able to effectively prevent the concentration of electric fields generated during microwave-heating upon the front end of the first protecting tube.

In the eighth configuration of the invention, since the side surface of the second protecting tube is perforated with a multiple number of small holes, variations of the oil-temperature can be transferred more quickly to the thermosensitive element.

In the ninth and tenth configurations, since the second protecting tube is made electrically equipotential with the first protecting tube, it is possible to prevent discharge and the like between the two due to the high-frequency electric fields.

In accordance with the eleventh feature of the invention, the oil vessel is stationed in the lower position at the start of heating so that foodstuffs held in the frying container are kept away from the cooking oil in the oil vessel. When the temperature detecting device, as detecting that the temperature of the cooking oil has reached a previously designated temperature, outputs the detected result to the controller, the controller activates the lifting device to drive the oil vessel to the upper position and controls the microwave-heating device to maintain the temperature of the Cooking oil in the oil vessel at the designated temperature after the oil vessel is stationed in the upper position.

In accordance with the twelfth feature of the invention, as detecting that the oil vessel has reached the upper position, the oil-vessel position detecting device outputs the detected result to the controller. Immediately after receiving the signal, the controller starts measuring time. When the door opening/closing detecting device detects that the door has not been opened before the passage of the a preset first time $t_1$ and outputs the detected result to the controller, the controller causes the informing device to warn the user of the fact that the door has not been opened. When the door opening/closing detecting device detects that the door has not been opened the passage of the a preset second time $t_2$ ($t_2 > t_1$) and outputs the detected result to the controller, the controller instructs the microwave-heating device to stop heating.

In accordance with the thirteenth feature of the invention, the door opening/closing detecting device, as detecting door-opening, outputs the detected result to the controller. Immediately after receiving the signal, the controller starts measuring time. When the door opening/closing detecting device detects that the door has not been closed before the passage of the a preset third time $t_3$ and outputs the detected result to the controller, the controller causes the informing device to warn the user of the fact that the door has not been closed. When the door opening/closing detecting device detects that the door has not been closed before the passage of the a preset fourth time $t_4$ ($t_4 > t_3$) from the start of measuring time and outputs the detected result to the controller, the controller instructs the lifting device to move the oil vessel to the lowered position.

In accordance with the fourteenth feature of the invention, when the door opening/closing detecting device, as detecting door-opening, outputs the detected result to the controller, the controller instructs the microwave-heating device to stop heating. Then, the temperature detecting device, as detecting that the temperature of the cooking oil has downed to a preset first temperature $T_1$, outputs the detected result to the controller, the controller informs the user of the temperature lowering via the informing device. If the temperature detecting means, as detecting that the temperature of the cooking oil has downed to a preset second temperature $T_2$ ($T_2 \leq T_1$), outputs the detected result to the controller, the controller instructs the lifting device to drive the oil vessel to the lowered position.

In accordance with the fifteenth feature, when in the fourteenth configuration the temperature detecting device, as detecting the temperature of the cooking oil, outputs the detected result to the controller, the controller calculates the inclination of temperature lowering based on the received signal and determines that the calculated inclination of temperature lowering is greater than a preset inclination of temperature lowering, the controller, neither warning the user nor driving the oil vessel to the lowered position, instructs the lifting device to maintain the oil vessel at the upper position.

In accordance with the sixteenth feature of the invention, when the user selects and item from a menu through a plurality of operating keys for menu-selection and activation of heating, the controller, in response with the selected item, sets up a cooking temperature $T_m$, a basic heating time $t_m$, a heating-time increment unit $t_u$ in association with a variation of the oil temperature. At the start of heating, the oil vessel is stationed in the lowered position so that foodstuffs held in the frying container are kept away from the cooking oil in the oil vessel. When the temperature detecting device, as detecting that the temperature of the cooking oil has reached the cooking temperature $T_m$, outputs the detected result to the controller, the controller activates the lifting device to move the oil vessel to the upper position and controls the microwave-heating device to maintain the cooking oil at the cooking temperature $T_m$. Then, the controller calculates a variation of the oil-temperature dT using a formula as follows:

$$dT = T_{max} - T$$

where $T_{max}$ indicates a maximum temperature detected after the start of frying and T indicates a temperature of the cooking oil detected during the heat-cooking. The controller further calculates a total heating-time $t_c$ using a formula as follows:

$$t_c = t_m + t_u \cdot dT$$

to thereby effect the heat-cooking operation during the calculated total heating-time $t_c$.

In accordance with the seventeenth feature of the invention, in the sixteenth configuration, the controller measures a preheating time $t_y$ until the temperature of the cooking oil reaches the cooking temperature $T_m$ and calculates a correcting time $t_n$ using a predetermined correcting time coefficient K as follows:

$$t_n = t_y \cdot K$$

whereby the total heating-time $t_c$ is corrected by the following formula:

$$t_c = t_m + t_u \cdot dT - t_n.$$

In accordance with the eighteenth and nineteenth features of the invention, in the sixteenth or seventeenth configuration, the controller also sets up an upper-limit temperature $T_u$ of the oil temperature at the time of selecting an item from the menu. When the temperature detecting device, as detecting that the oil-temperature has reached the upper-limit temperature $T_u$ after the start of heat-cooking, outputs the detected result to the controller, the controller prohibits renewal of the total heating-time $t_c$.

In accordance with the twentieth and twenty-first features of the invention, in the sixteenth or seventeenth configuration, the controller also sets up a first time $t_h$ at the time of selecting an item from the menu, and when the controller recognized that a remaining time $t_z$ calculated by a subtraction of an actual heating-time $t_a$ which is measured by the controller from the total heating-time $t_c$ is shorter than the first time $t_h$, the controller instructs the displaying portion to display the remaining time and prohibits renewal of the total heating-time $y_c$.

In accordance with the twenty-second and twenty-third features of the invention, in the twentieth or twenty-first configuration, the controller also sets up a second time $t_k$ at the time of selecting an item from the menu, and when the controller recognized that a remaining time $t_z$ calculated by a subtraction of an actual heating time $t_a$ which is measured by the controller from the total heating-time $t_c$ is shorter than the second time $t_k$, the controller prohibits the displaying portion from displaying the remaining time.

In accordance with the twenty-fourth feature of the invention, in the sixteenth configuration, the controller prohibits the user from inputting foodstuffs into the frying container during the preheating until the temperature of the cooking oil held in the oil vessel stationed in the lowered position reaches the cooking temperature $T_m$. When the temperature of the cooking oil has reached the cooking temperature $T_m$, the controller permits the user to input foodstuffs into the frying container and controls the oil vessel to be stationed in the lowered position and the microwave-heating device to maintain the cooking oil at the cooking temperature $T_m$ until the door is opened. After the foodstuffs are input into the frying container and the door is closed, the controller controls the oil vessel to be stationed in the lowered position and the microwave-heating device to reenter the preheating mode.

Finally, in accordance with the twenty-fifth feature of the invention, in the twenty-fourth configuration, the controller instructs the displaying portion to display that the apparatus is in a state allowing the user to input foodstuffs into the frying container.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

An embodiment of a microwave fryer of the present invention will be described in detail with reference to the drawings.

Figure 1:
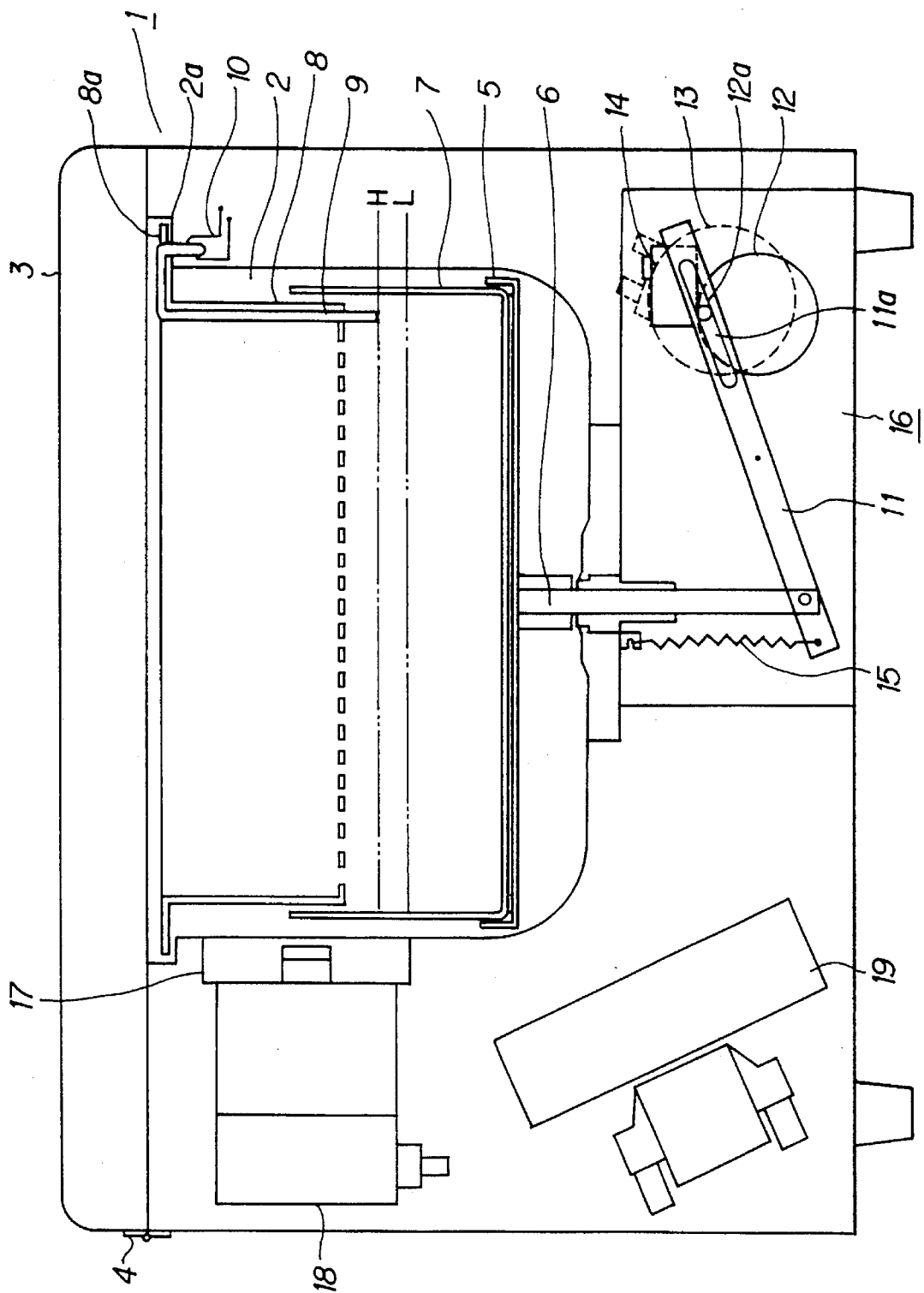
FIG. 1 is a vertical sectional view showing main components of a microwave fryer in accordance with an embodiment of the present invention.

FIG. 1 is a vertical sectional view showing main components of a microwave fryer of the present invention. This microwave fryer comprises: a main body 1 incorporating a heating chamber 2 with an opening on top; and a lidding body 3 which has a handle (not shown) on the front side thereof and is rotatably supported by a hinge 4 on the backside thereof so as to be opened and closed over the opening of the heating chamber 2. Here, the confinement of the heating chamber 2 with the lidding body 3 is constructed so that no microwaves escape from the chamber. A flat table plate 5 is disposed in the inner bottom of the heating chamber and is removably attached to a table supporting shaft 6. An oil vessel 7, transparent glass receptacle of a bottomed cylinder is mounted on the table plate 5. A frying container 8, with a bottom cylinder made of stainless steel, is removably mounted in the inner upper portion of the oil vessel 7 with its handle portion 8a engaged with the opening step 2a of the heating chamber 2.

Provided for the handle portion 8a of the frying container 8 is an oil-temperature sensor 9 for detecting the temperature of oil in the oil vessel 7. This sensor 9 outputs an oil-temperature signal by way of an electric connector 10 to a controller incorporated in the main body 1.

A clearance between the opening side of the frying container 8 and the inner surface of the lidding body 3 is set to be some millimeters or less so that any microwaves cannot enter the frying container 8.

In FIG. 1, 'H' and 'L' respectively designate maximum and minimum levels of an appropriate oil quantity range, to be described later.

Figure 2:
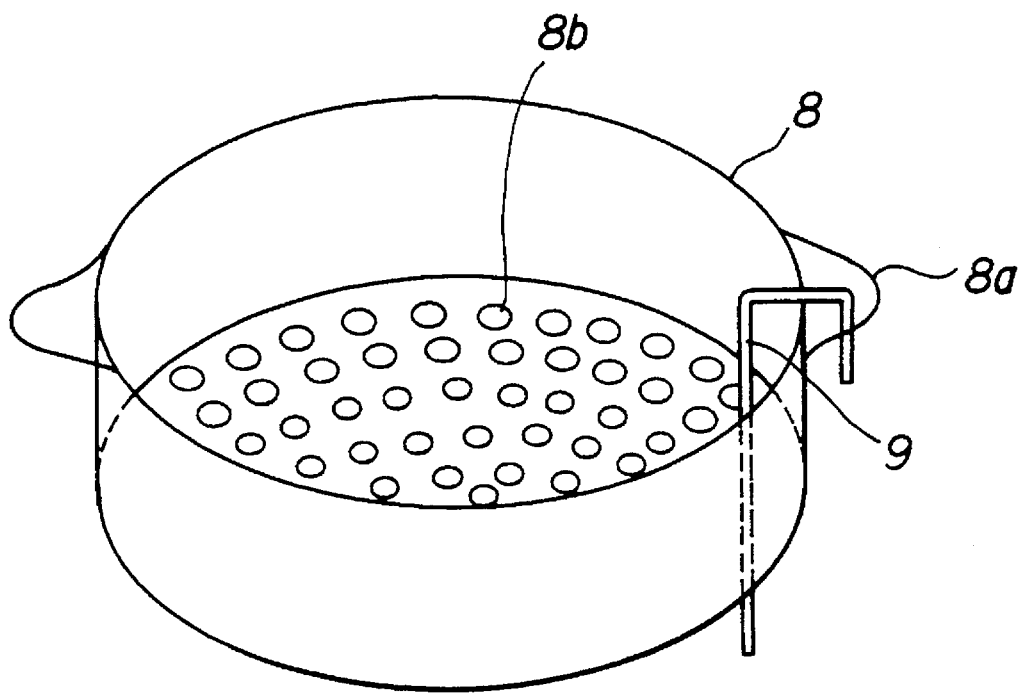
FIG. 2 is a perspective illustration showing a typical frying container for used in the present invention.

The frying container 8 may use a conventional basket type receptacle, but a receptacle With a group of holes 8b in the bottom as shown in FIG. 2 is effectively used in the embodiment. More specifically, the bottom face of the frying container 8 is provided as shown in FIG. 2 with a group of holes 8b perforated to hardly transmit microwaves when the container is in the atmosphere and to transmit microwaves when it is immersed in the oil. A diameter of the group of holes 8b is 3 to 15 mm (preferably 9 mm in the embodiment) and distances between holes are set to be 10 mm.

Radiation of microwaves cannot transmit through the bottom face of the frying container 8 having holes 8b with a diameter of 15 mm or less when the container 8 is in the air since the dielectric constant of the air as a medium of microwaves, $\epsilon\gamma$, is about 1 and therefore microwaves attenuate during the transmission. This functions the same as the punching plate disposed in the door of a microwave oven functions. In contrast, since the dielectric constant of oil, $\epsilon\gamma$, is about 3 to 5 as a medium of microwaves, when the frying container 8 is immersed into the oil, microwaves, which attenuate during the transmission through the air, pass through the oil into the frying container 8 reaching foodstuffs. For example, suppose that the frying container 8 with the holes 8b with the aforementioned diameter is immersed in the oil and microwaves are applied intermittently to the oil, vigorous bubbles arise from the foodstuffs in the frying container during the application of microwaves, and the generation of bubbles from the food stuffs stops when the application of microwaves is shut down. That is, microwaves pass through the holes 8b of the frying container 8 and reach the foodstuffs when the container is immersed in the oil.

The table supporting shaft 6 is adapted to pass through the bottom wall of the heating chamber 2 and is allowed to move up and down. An lifting lever 11 is connected at a first end thereof with the lower end of the shaft 6 so that the lever 11 can rotate. The lifting ever 11 is rotatably supported at a center portion thereof by the main body 1. The lever 11 is provided on a second half side thereof with an elongate cam slot 11a which is engaged with a crank pin 12a planted on a disc 12 connected to a driver motor 13, so that the lifting lever 11 is linked with the driver motor 13 through the cam mechanism. A reference numeral 14 designates a micro switch for detecting the bottom dead point of the table supporting shaft 6. That is, the micro switch 14 detects the bottom dead point when the second end of the lifting lever 11 reaches its top dead point and the crank pin 12a presses a knob of the switch.

A pulling spring 15 is stretched across the first end of the lifting lever 11 and the outer bottom of the heating chamber 2. The spring constant of the spring 15 is set up so that the force arising when the spring is extended to the half of the maximum extended length (when the lifting lever is positioned horizontally) cancels out the weight of the oil vessel 7 with a predetermined quantity of oil. This setup condition reduces the starting torque whereby the driver motor 13 is reduced in cost.

That is, with this configuration, it is possible to reduce the load for starting the driver motor 13, and this allows the use of a low-power driver motor resulting in reduced cost.

In this embodiment, a lifting mechanism 16 is composed of the table supporting shaft 6, the lifting lever 11, the disc 12 with a crank pin, the driver motor 13, the micro switch 14 and the spring 15.

This lifting mechanism 16 operates as follows. Initially, as the rotatable disc 12 rotates clockwise, the slider provided for the disc 12 slides along the slot formed in the second half of the lever 11. The lever 11 rotates clockwise about the supporting axis at the approximately central portion thereof. The second or right half of the lever 11 moves downward. The first or left half of the lever 11 moves upward so that the oil vessel 7 is pressed up through the supporting shaft 6. In this arrangement, the second end of the rotating lever 11 turns on or off the micro switch 14 for detecting the position of the oil vessel (the oil vessel detecting means in FIG. 3) whereby the controller is able to detect the position of the oil vessel 7.

Figure 3:
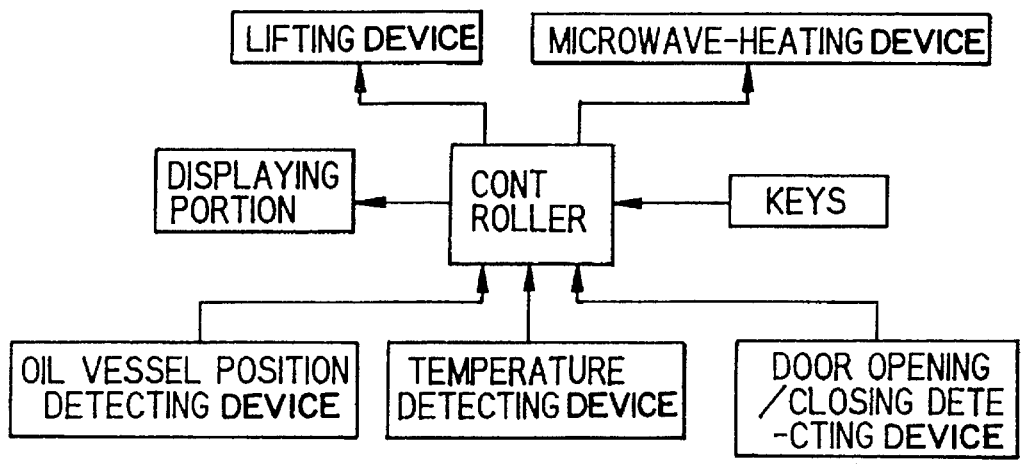
FIG. 3 is a block diagram schematically showing a controlling circuit of a microwave fryer of the present invention.

FIG. 3 is a block diagram schematically illustrating the operation of the controller. As is apparent from FIG. 3, the controller for use in the microwave fryer of the invention controls the operations of a microwave-heating device, a lifting device and a displaying portion in accordance with electric signals sent from a temperature detecting device, a door opening/closing detecting device, an oil-vessel position detecting device and a group of keys.

Returning to FIG. 1 already stated, the configuration further includes a wave-guide 17 for supplying radiation of microwaves to the heating chamber 2, a magnetron (microwave-radiation generating device) 18 arranged in the wave-guide 17 and a ventilating or fan 19 for cooling heating components such as the magnetron 18, unillustrated high-voltage transformers etc.

Provided on the upper front 0f the main body 1 is a control panel (not shown) including a control device made up of the group of keys as referred to in FIG. 3 such as a menu key, a start key etc., a displaying device, a controller substrate having a microcomputer governing the total control of the fryer.

Figure 4:
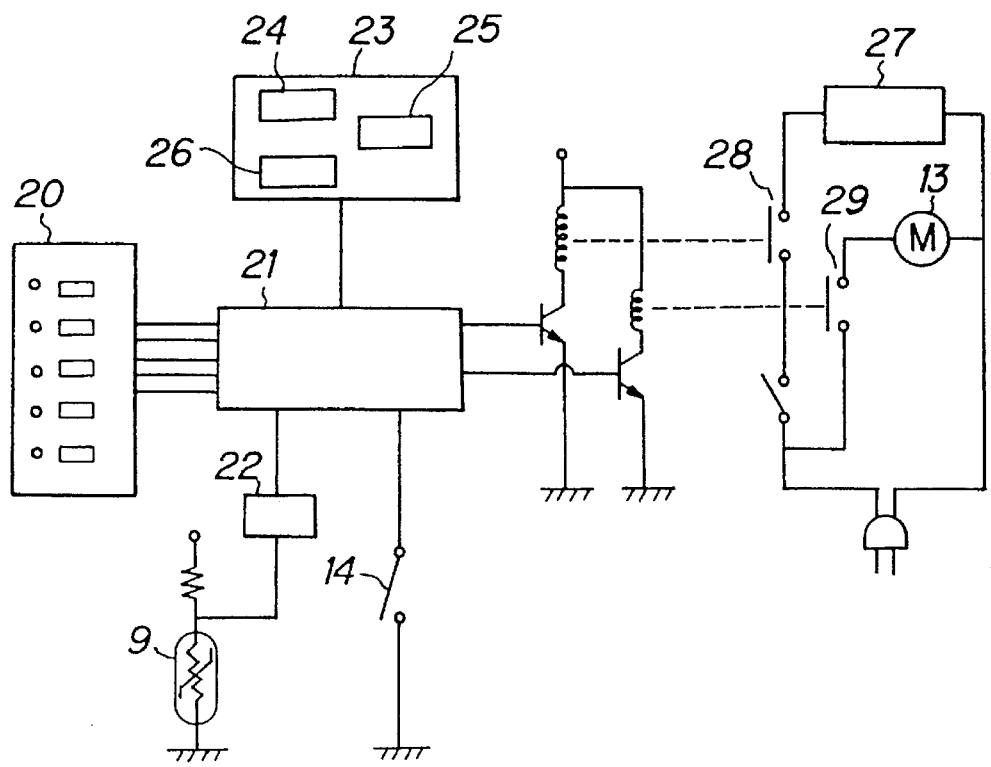
FIG. 4 is an electric block diagram showing the controlling circuit of FIG. 3 in a more specific manner.

FIG. 4 is an electric block diagram showing a more detailed configuration of the illustrative block diagram already described in FIG. 3. A control panel 20 has a key for setting up a temperature of oil, a key for setting up a frying time, a key for setting up a sort of foodstuffs to be fried, a start key etc. Signals corresponding to operations of the above keys are supplied to an interface 21. Output from the oil-temperature sensor 9 is supplied to the interface 21 via an A/D converter 22 while a signal from the micro switch 14 which detects the bottom dead point of the table supporting shaft is directly supplied to the interface 21. The interface 21 is connected to a processing circuit 23 embodied with a microcomputer and the like. That is, the processing circuit 23 is composed of a CPU 24, a ROM 25, a RAM 26 and the like to govern the control of the whole fryer. Output from the interface 21 is supplied to a switching transistor which is connected in series with a relay coil to thereby effect switching operations of a switch 28 for drive controlling and another switch 29 for controlling a driver motor 13.

Since in the aforementioned fryer of the prevent invention, the frying container 8 and the oil vessel 7 can easily be taken out when the lidding body 3 is open, the replacement of oil as well as cleaning of the oil vessel 7 and the frying container 8 can be easily done.

When the oil vessel 7 and the frying container 8 are removed, an unillustrated rice cooking container with a predetermined amount of rice is set,on the table plate 5 in place and impressed with radiation of microwaves from the magnetron 18 so that the rice can be cooked. In this case, by forming the rice cooking container with a microwave absorbing and heating material, the whole part of rice cooking container is lifted in temperature so that the rice can be heated and cooked totally and uniformly.

In this apparatus, if a frying operation is performed in such a manner that foodstuffs in the frying container 8 is preheated by radiation of microwaves before frying, it is possible to realize a better cooking condition. More specifically, after the oil in the oil vessel 7 is heated by radiation of microwaves to a preset temperature, the frying container with foodstuffs is downed by the lifting mechanism 16 to a level at which the frying container 8 is not dipped into the oil held in the oil vessel 7 while the top opening of the frying container 8 is kept away from the lidding body 3 so that microwave can be radiated on the inside of the frying container 8 in order to preheat the content in the frying container 8 so that surplus water contained in the foodstuffs may be removed. Thereafter, the frying container 8 is further descended so as to be immersed into the oil in the oil vessel 7 for the frying operation.

Although the lidding body 3 is covered over the top opening of the frying container 8 to seal electric waves, a lid which can be opened and closed over the top opening of the frying container 8 to effect sealing against microwaves. In this case the lid is preferably formed so as to be separable for convenience.

Figure 5:
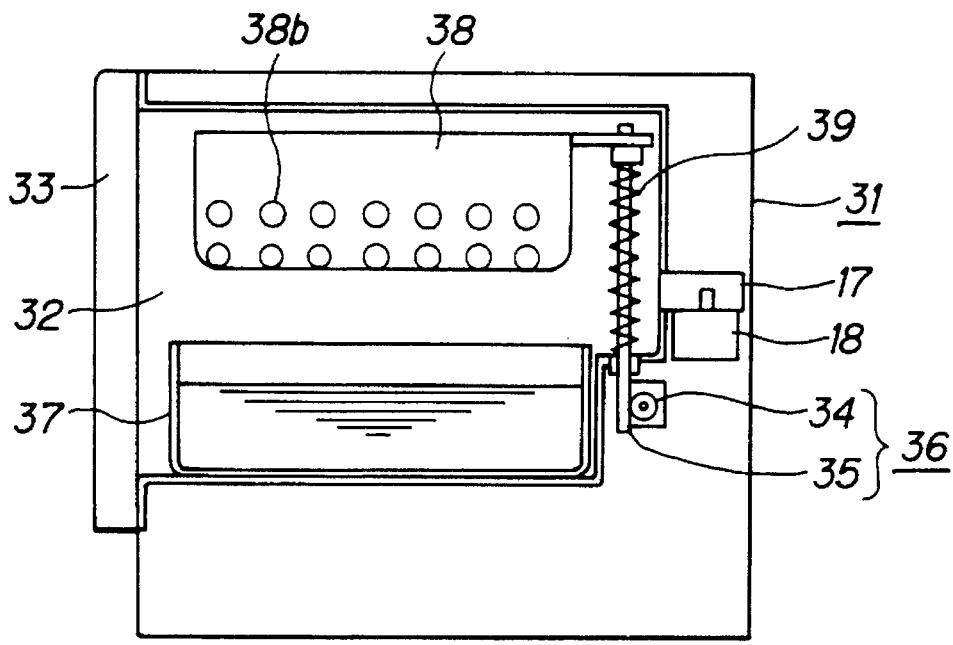
FIG. 5 is a vertical sectional view showing a prior art lifting means in which a frying container used in the present invention is positioned up.
Figure 6:
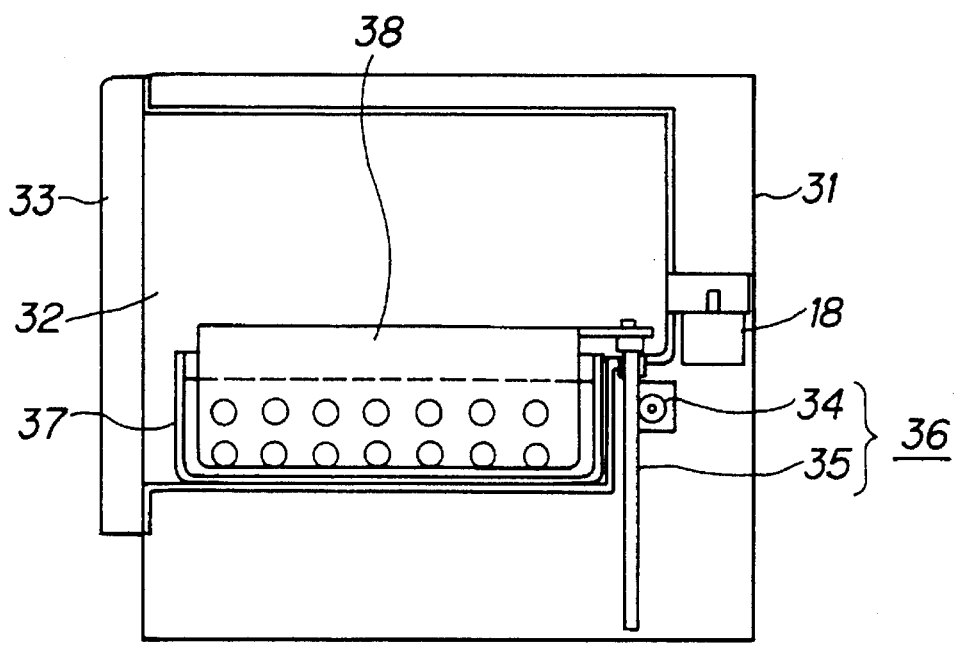
FIG. 6 is a vertical sectional view showing the means in FIG. 5 in which the frying container is positioned down.

FIGS. 5 and 6 show an embodiment of a fryer in which a frying container is lifted up and down in contrast to the aforementioned embodiment. FIG. 5 shows a state where the frying container is positioned up and FIG. 6 shows a state where the frying container is positioned down. The functions of the fryer are the same as with those of the aforementioned one, so that main components will be mentioned without description and only the different part will be described.

Here, lifting device shown in FIGS. 5 and 6 in this embodiment are actually conventionally disclosed ones by themselves; nevertheless, needless to say, any other device which may serve the same purpose could be equally adopted. In these figures, the apparatus comprises a main body 31, a heating chamber 32, a lidding body (door) 33, the lifting device 36 (a well-known lifting device disclosed in Japanese Patent Application Laid-Open Sho-58 No. 136, 321) consisting of a toothed wheel 34 fixed to the motor shaft of a driver motor and an up-and-down rack mated with the toothed wheel 34, an oil vessel 37, a frying Container 38 whose top opening is sealed against microwaves at its topmost position by a ceiling of the heating chamber 32 and which is immersed into the oil vessel 37 at its down position, with its bottom and lower side wall provided with holes 38b for transmitting radiation of microwaves when it is in the oil but prohibiting radiation of microwaves from transmitting when it is in the air. Designated at 39 is a contracting spring which urges the frying container 38 upward. Here, reference numerals 17 and 18 designate a wave,guide and a magnetron 18, respectively.

Next, description will made on a temperature detecting device precisely working in the microwave fryer of the present invention.

Referring to FIG. 1, if, for example, the temperature of the oil is set at 160° to 180° C. as a pertinent temperature for frying, the oil vessel 7 is positioned down until the temperature of oil reaches the preset temperature so that the radiation of microwaves can be supplied efficiently to only the oil. When the temperature of oil reaches the preset value, the temperature detector 9 detects it and outputs the information to the controller. The controller activates the lifting mechanism 16 to lift the oil vessel 7 up to the top position so as to allow frying operation. When the oil vessel 7 is stationed at the upper position, microwaves are supplied through the oil as a medium to the inside of the frying container 8. Therefore, the foodstuffs inside the container are both externally heated from the outside through the heat of the oil and internally heated by the microwaves so that the foodstuffs may be fried in an optimal condition.

Since the oil-temperature detector 9 detecting the temperature of oil is integrally attached to the frying container 8 as shown in FIG. 1, when the frying container 8 is set in the heating chamber 2 by the user, the temperature detector 9 is connected to the connector 10 disposed outside the heating chamber 2. The temperature detector 9 has a thermosensitive element such as a thermistor incorporated at its tip, and this portion serves as a thermosensitive part. The temperature detector 9 is set so that this thermosensitive part is positioned lower than the bottom of the frying container 8 and immersed in the oil even when the oil vessel 7 is stationed at the down position.

Figure 7:
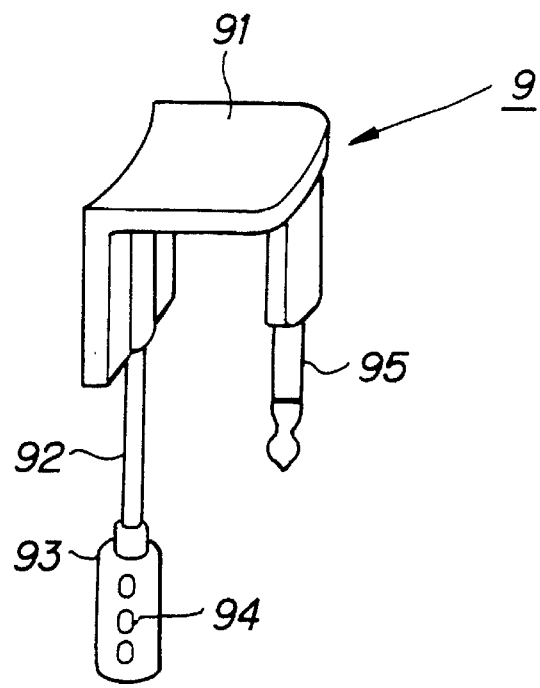
FIG. 7 is an enlarged perspective view showing an embodiment of a temperature detector used in a microwave fryer of the present invention.
Figure 8:
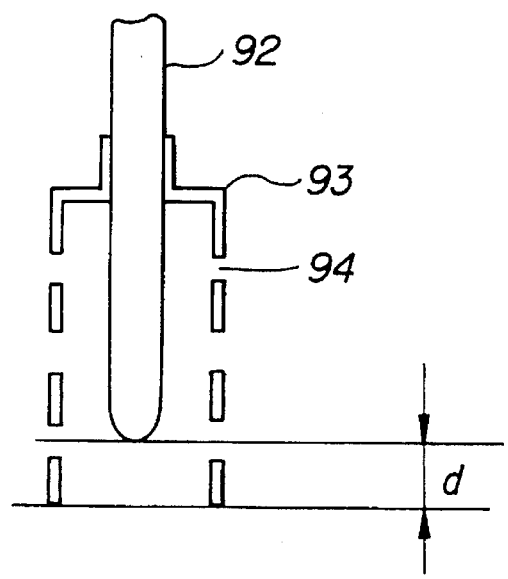
FIG. 8 is an enlarged sectional view showing a tip portion of the temperature detector shown in FIG. 7.

FIG. 7 is an enlarged perspective view showing an embodiment of a temperature detector used in a microwave fryer of the invention. FIG. 8 is an enlarged sectional view showing a tip portion of the temperature detector in FIG. 7. As shown in FIGS. 7 and 8, the temperature detector 9 is composed of a first protecting tube 92 made of a metal, a second protecting tube 93 made of a metal which covers the first protecting tube and has an opening at its distal end, a supporting member 91 made of a heat-resistant resin etc., for attaching the temperature detector 9 to the frying container 8, and a plug portion 95 to be made with the connector 10 shown in FIG. 1. The thermosensitive element (not shown) such as a thermistor etc., is accommodated inside the tip of the first protecting tube 92. The reason the front end of the second protecting tube 93 is opened is to promote the transmission of temperature change to the thermosensitive element. With this arrangement, the thermosensitive element is shielded from microwaves.

Any kind of metals can be used for forming the first and second protecting tubes as long as it is able to shield microwaves. Accordingly, metals in general can be used as a material for the protecting tubes, but in view of corrosion due to the oxidation of metal and due to heat as well as other factors problematic as a food processor, stainless steel is preferably used. Here, there is no need to form the first and second protecting tubes with the same material.

Figure 9:
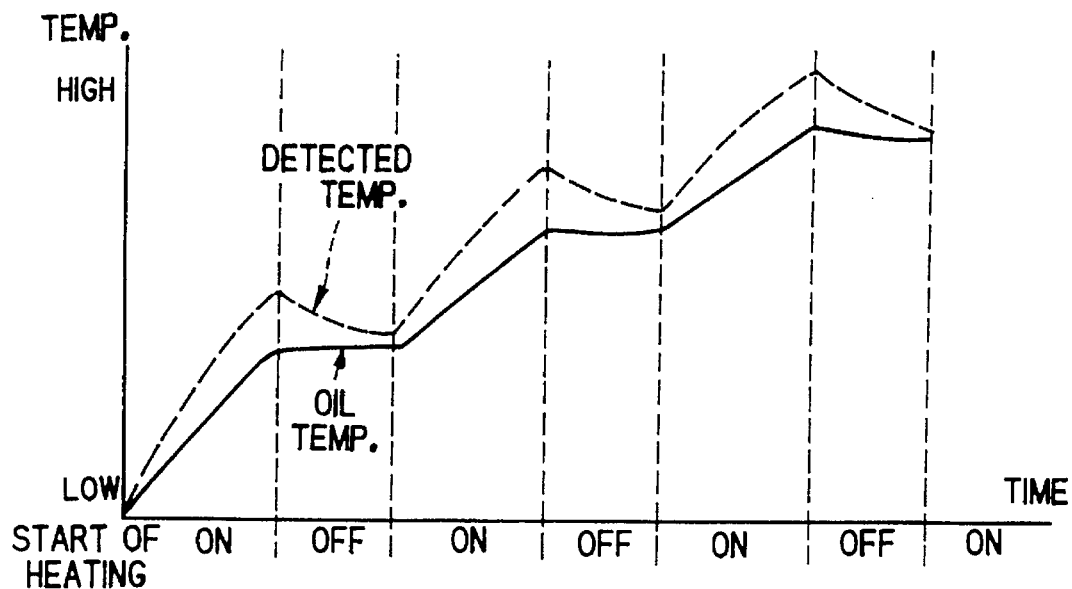
FIG. 9 is a chart showing output signal characteristics of a thermosensitive element when a temperature detector has no second protecting tube.

FIG. 9 shows output signal characteristics of a thermosensitive element when a temperature detector has no second protecting tube. In FIG. 9, in order to confirm the influence of microwaves upon the output of the thermosensitive element, output variations of the thermosensitive element in response to temperature variations of the oil are shown in terms of temperatures when radiation of microwaves is effected intermittently. Specifically, when the microwave heating is turned on, the oil is heated and the temperature of oil is elevated whereas the oil is self-cooled when the microwave heating is turned off. As shown in FIG. 9, with no second protecting tube, the temperature detector presented higher temperatures than real oil-temperatures during heating. This can be considered as that electric fields tend to be concentrated on the front end of the first protecting tube whereby the part is locally heated. At the time of the radiation off, no locally heating occurs, so that the temperature detector presented temperatures close to the real oil-temperature, but the lowering amount of the oil-temperature detected became greater than that of the real oil-temperature. These phenomena are eliminated when the second protecting tube is provided for the temperature detector as shown in FIGS. 7 and 8. That is, the provision of the second protecting tube makes it possible for the thermosensitive element to always output values corresponding to the real oil-temperature and allows the measurement of the real oil-temperature.

A preferable diameter of the second protecting tube is about 10 mm or more. With a second protecting tube with a diameter of less than 10 mm, the second protecting tube itself attracts the electric fields and elevates in temperature possibly causing erroneous detection by the thermosensitive element inside the first protecting tube. There is no particular relation between the diameters of the first and second protecting tubes. Typically, the first protecting tube is about 3 to 4 mm in diameter. If the first protecting tube has a lower diameter than this, it becomes difficult to insert the thermosensitive element thereinto, and the strength of the protecting tube becomes insufficient. In contrast, the first protecting tube having a greater diameter than the above range deteriorates the response of the thermosensitive element.

The second protecting tube is preferably constructed so as to stand out from the level of the front end of the first protecting tube as shown in FIG. 8. This projection more effectively prevents the concentration of electric fields on the tip of the first protecting tube during heating. The size of projection 'd' of the second protecting tube from the first protecting tube is preferably about 2 mm or more. With the projection 'd' of 2 mm or more, it was empirically confirmed that the deviation of the temperature caused by the concentration of electric fields could be eliminated.

Figure 10:
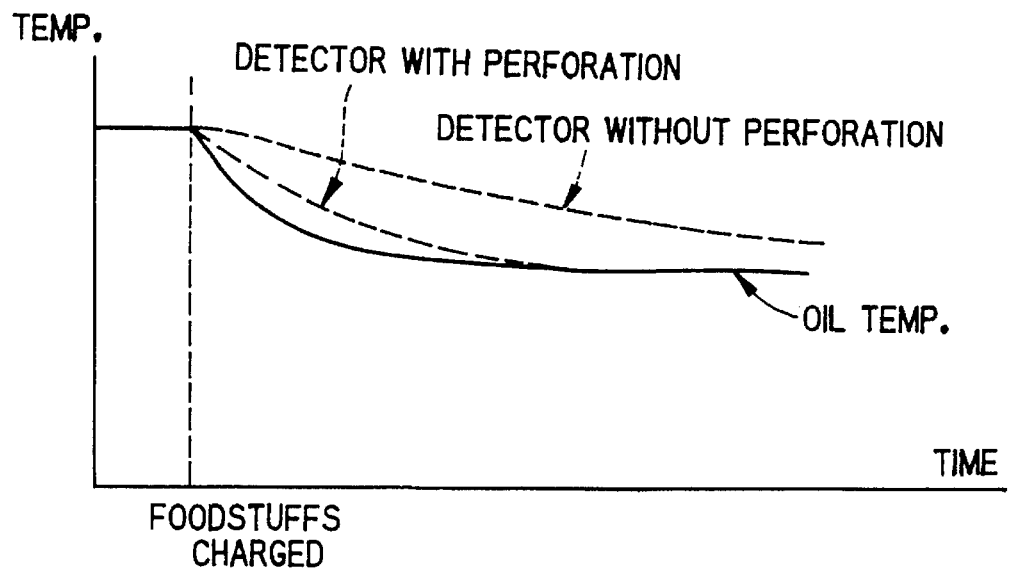
FIG. 10 is a chart showing a difference in responding performances of a temperature detector to changes in oil temperature between cases where a second protecting tube has small holes and no small holes.

As shown in FIGS. 7 and 8, it is preferable that a plurality of small holes 94 are provided on the side surface of the second protecting tube 93. FIG. 10 shows a difference in responding performances to changes in oil-temperature between cases where the second protecting tube has small holes and no small holes. As is apparent from FIG. 10, existence of the small holes improves the response to temperature variations of oil when foodstuffs are immersed in the oil. That is, since only the opening of the front end of the second protecting tube cannot convey heat well enough therethrough, it takes a considerably long time for the oil around the detector to become equal to the real oil-temperature. The small perforation on the side surface of the second protecting tube promotes the heat-transfer in the oil so that the response to the temperature variations can be improved. The diameter of the perforation on the second protecting tube preferably falls within a range from 1 to 5 mm. If the diameter of the holes is smaller than the above range, the response to temperature variations of the oil becomes worse. Increasing the number of holes to compensate the degradation of the response makes it difficult to form the part and results in degraded strength. In contrast, if the diameter of the small holes is greater than the above range, the shielding effect of microwaves is reduced. In this embodiment, 12 holes with 3 mm in diameter were formed on the side of the second protecting tube.

The first and second protecting tubes are preferably made equal in electric potential because if there is any potential difference between the first and second protecting tubes or the first and second tubes are electrically floated from each other, the high-frequency fields applied could induce discharge between the protecting tubes or cause any other adverse effects, decreasing the reliability of the device and resulting in a degraded accuracy of detection.

Next, the operation of the microwave fryer of the invention thus constructed will be described with reference to flowcharts shown in the drawings.

Figure 11:
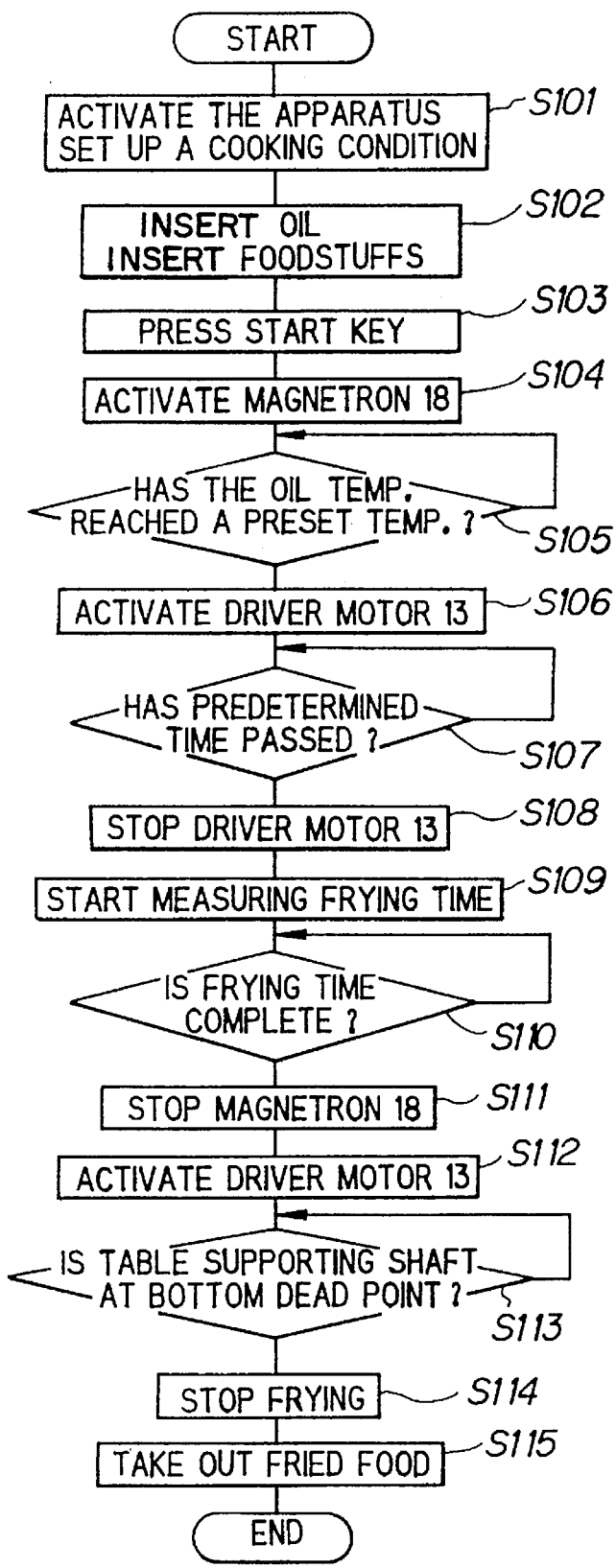
FIG. 11 is a flowchart illustrating a controlling operation of a microwave fryer of the present invention.

Initially, the controlling operation will be explained referring to a flowchart shown in FIG. 11.

At first, the fryer is activated and the type of foodstuffs to be fried is selected or a temperature of oil and a frying time are set up (S101). Opening the lidding body 3, an operator inserts a required quantity of oil into the frying container 8. The oil flows into the oil vessel 7 from the frying container 8. When oil is completely supplied to the oil vessel 7, foodstuffs are fed into the frying container 8 (S102). The operator, after closing the lidding body 3, presses the start key (S103). With the oil vessel 7 at the lowered position, as the microwave generator 27 is activated (S104), the oil inside the oil vessel 7 is heated. At this time, since the foodstuffs inside the container 8 are in the air, radiation of microwaves is shielded so that the foodstuffs are hardly heated.

When the oil is heated to a temperature designated through the control panel 20 and the oil-temperature sensor 9 detects the designated temperature (about 180° C.) (S105), the driver motor 13 is driven during a required time (a timer required for lifting the table supporting shaft from the bottom dead point to the top dead point), to raise the oil vessel 7 (S106 to S108), so that the frying container 8 is immersed into the oil. In this state, microwaves are supplied to the inside of the frying container 8, whereby the foodstuffs are heated with radiation of microwaves while fried in the oil heated by the radiation of microwaves (S109).

As the frying time elapses (S110), the microwave generator 27 stops (S111) and the driver motor 13 is activated (S112) to thereby lower the oil vessel 7. When the micro switch 14 detects the bottom dead point of the table supporting shaft and outputs a detection signal, the driver motor 13 stops in response to the signal (S113). After the lapse of a predetermined time (for instance, 30 seconds) required for completely removing excessive oil, an unillustrated informing device is made active to inform that the frying operation is complete (S114).

As the automatic frying operation is thus finished, the operator opens the lidding body 3 and takes out the fried food from the frying container 8 (S115). For a subsequent frying operation to be done, the operator may insert foodstuffs into the frying container 8, close the lidding body 3 and press the start key. Then, the same operation as described above will be repeated. In this case, if the oil in the oil vessel 7 is kept at the designated temperature, the frying operation resumes from the step at which the oil vessel 7 is moved up.

Figure 12:
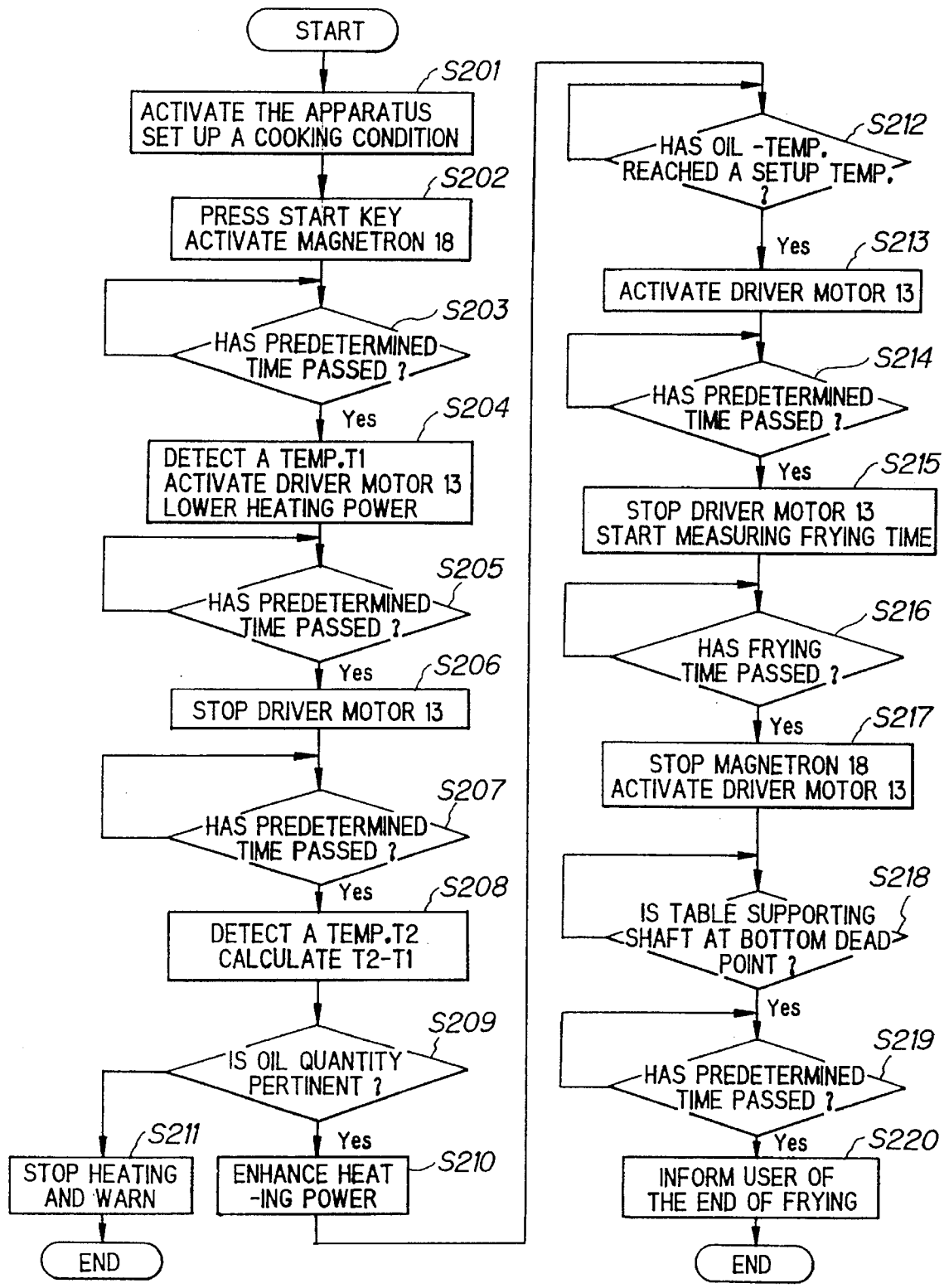
FIG. 12 is a flowchart illustrating a controlling operation of distinguishing the propriety of the quantity of oil in a microwave fryer of the present invention.

FIG. 12 is a flowchart of an operation of another embodiment of a microwave fryer of the present invention. Based on the flowchart the operation will be explained. First, the fryer is activated and a sort of foodstuffs to be fried is selected or a temperature of oil and a frying time are set up (S201). Opening the lidding body 3, the operator inserts foodstuffs into the frying container 8, closes the lidding body 3 and presses the start key. Then the apparatus enters a characteristic step of the present invention in which the propriety of the quantity of oil is distinguished.

Now, description will be made of the configuration and the controlling operation of the embodiment for judging the propriety of the oil quantity. In the beginning, the front end of the temperature sensor 9 is positioned as shown in FIG. 1 at the same height with the maximum level 'H' within an appropriate range of oil when the oil vessel 7 is set in the standard position. In this state, the microwave generator 27 is activated so that the oil in the oil vessel 7 is heated for a predetermined period of time to elevate the temperature of the oil (S202). The temperature to which the oil is heated is not limited is a certain temperature difference from the temperature of the atmosphere (air) above the oil surface can be assured. In this embodiment the aforementioned predetermined period of time is set so that the temperature of the oil is elevated by 30° C.

After the oil is heated for the predetermined period of time (S203), the oil-temperature sensor 9 detects a temperature T1. Then the lifting mechanism 16 is activated for a predetermined period of time required for lifting up the oil vessel 7 by a predetermined height (S204, S205). This predetermined height is set so as to be equal to the width of the acceptable quantity range of the oil held in the oil vessel or the level difference between the maximum level 'H' and the minimum level 'L' of the acceptable oil quantity range as shown in FIG. 1. When the movement of the oil vessel 7 is complete (S206), after a lapse of time (some seconds) allowing the oil-temperature sensor 9 to detect a stabilized temperature (S207), the oil-temperature sensor 9 meters a temperature T2 (S208). Based on the result, that is, the varying amount (varied width) between the detecting temperatures T1 and T2 or the varying rate, the processing circuit 23 distinguishes whether the quantity of oil is acceptable (S209).

This judgment is made using the facts described as follows. Since the temperature of oil differs from the temperature of the atmosphere by about 20° C., if the quantity of oil is within the acceptable range, the condition to which the oil-temperature sensor 9 is exposed must change from the non-immersed state to the oil-immersed state. Therefore the temperature varies greatly or varying rate becomes large. If the quantity of oil is less than the acceptable range, the condition under which the oil-temperature sensor 9 is placed does not change, remaining in state to the non-immersed state. Therefore, the temperature varies little or the varying rate becomes small. When the quantity of oil is over the acceptable range, the condition under which the oil-temperature sensor 9 is placed changes does not change, remaining in the oil-immersed state so that the temperature varies little or the varying rate becomes small. That is, when the varying amount or rate is greater than a predetermined value (for example, 10° C.), the quantity of oil is judged as to be acceptable (S210), while it is determined as to be unacceptable if the varying amount or rate is smaller than the value (S211).

If the temperature in the system varies due to the activation of the microwave generator 27 from the time of the first detection (detected temperature: T1) to the second detection (detected temperature: T2), the detected temperature T2 will be erroneous. To avoid this, the power of the microwave generator 27 should be lowered to just maintain the system temperature when the temperature T1 is detected. If the time from the first detection of the temperature T1 to the second detection of the temperature T2 is so short that there is no possibility to lead to misjudgment even if the microwave generator 27 is deactivated, it is preferable to turn off the microwave generator during that time in view of the controllability.

In the above embodiment, the tip of the oil-temperature sensor 9 is set at the maximum level 'H' of the acceptable oil quantity range when the oil vessel 7 is set in the standard position and the propriety of the oil quantity is judged with reference to the maximum level. That is, this scheme determines three cases: whether the quantity of oil is within the appropriate range, less than the appropriate level or greater than the appropriate level. However, if the apparatus requires only the judgment as to whether the quantity of oil is in the appropriate range or less than the level without needing the decision of the case where the quantity of oil is greater than the appropriate level, the tip end of the oil-temperature sensor 9 may be positioned at the minimum level 'L' of the acceptable oil quantity range when the oil vessel 7 is set is the standard position. In this case, if the quantity of oil is in the acceptable range, the condition to which the oil-temperature sensor 9 is exposed do not change from the oil-immersed state so that the varying amount or rate of temperature becomes small. In contrast, if the quantity of oil is less than the acceptable level, the condition under which the oil-temperature sensor 9 is placed changes from the non-immersed state to the oil-immersed state so that the varying amount or rate of temperature becomes large.

When the quantity of oil is judged as to be unacceptable in the above oil-amount determination, the apparatus stops heating and gives warning that the quantity of oil is unacceptable (S211). When the quantity of oil is judged as to be acceptable, the apparatus continues to heat the oil with a restored normal power until the oil reaches the designated temperature (S210). During this heating step, the frying container 8 is placed in the air so that radiation of microwaves is shielded and the foodstuffs are hardly heated.

When the oil is heated to the temperature designated through the control panel 20 and the oil-temperature sensor 9 detects the designated temperature (about 180° C.) (S212), the driver motor 13 is driven during a required time (a timer required for lifting the table supporting shaft from the bottom dead point to the top dead point), to raise the oil vessel 7 (S213 to S214), so that the frying container 8 is immersed into the oil. In this state, microwaves are supplied to the inside of the frying container 8, whereby the foodstuffs are heated with radiation of microwaves while fried in the oil heated by the radiation of microwaves (S215).

As the frying time elapses (S216), the microwave generator 27 stops and the driver motor 13 is activated to thereby down the oil vessel 7 (S217). When the micro switch 14 detects the bottom dead point of the table supporting shaft and outputs a detection signal, the driver motor 13 stops in response to the signal (S218). After the lapse of a predetermined time (for instance, 30 seconds) required for completely removing excessive oil S219), an unillustrated informing device is made active to inform that the frying operation is complete (S220).

As the automatic frying operation is thus finished, the operator opens the lidding body 3 and takes out the fried food from the frying container 8. For a subsequent frying operation to be done, the operator may insert foodstuffs into the frying container 8, close the lidding body 3 and press the start key. Then, the same operation as described above will be repeated.

Referring next to the drawings and flowcharts (FIGS. 13 to 20), description of the microwave fryer of the invention will be made as to controlling operations of a case where the user has forgotten the use of the apparatus and leaves it in operation.

Figure 13:
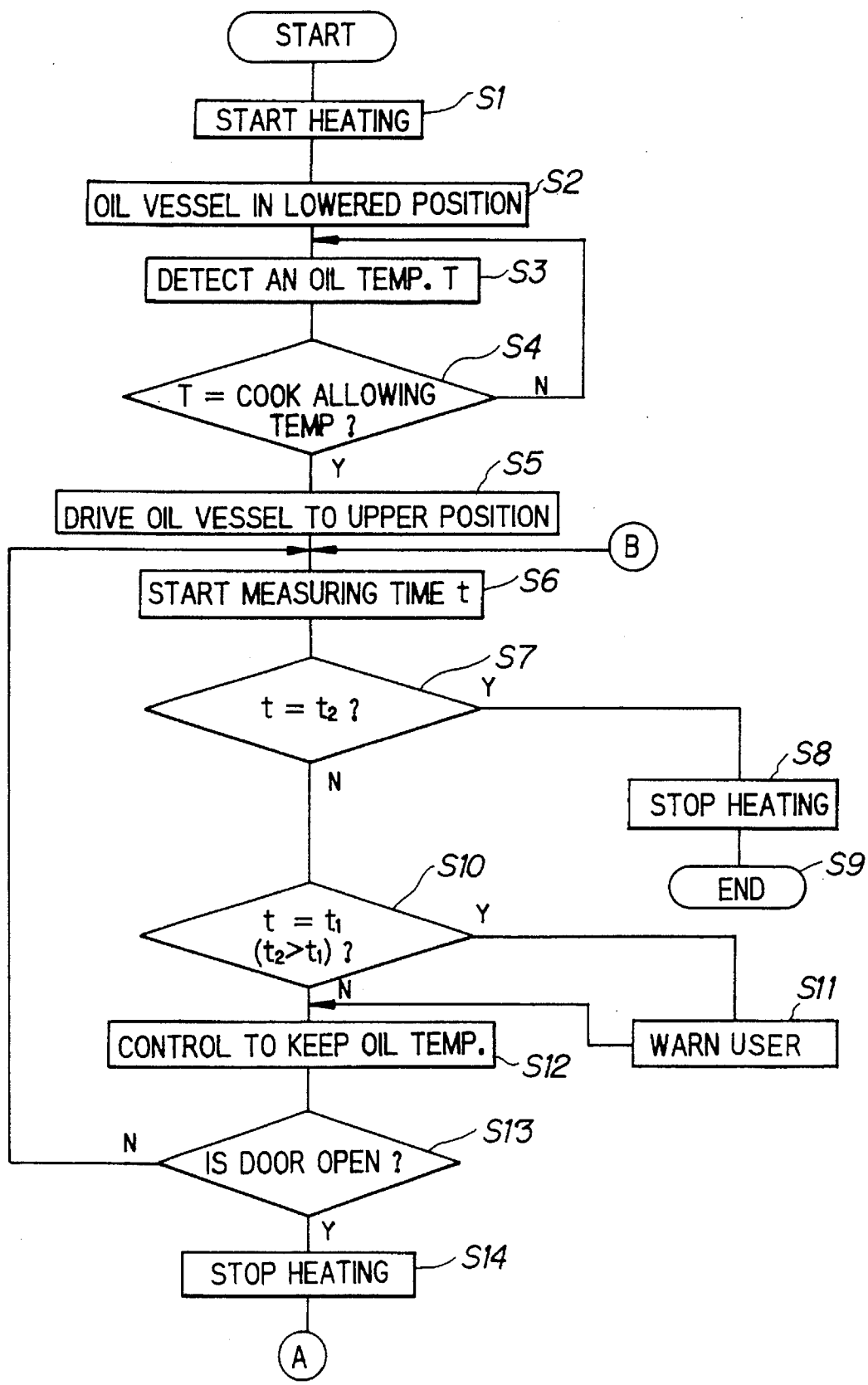
FIG. 13 is a flowchart illustrating a controlling example of a microwave fryer of the present invention in a case where the user has forgotten the use of the apparatus.

First, FIG. 13 is a flowchart illustrating a controlling example of the microwave fryer of the invention in a case where the user has forgotten the use of the apparatus. At a step 1 (S1), the cooking oil held in the oil vessel is heated by way of the magnetron. In this heating, the oil vessel remains in the lowered position so that foodstuffs held in the frying container may not come in contact with the cooking oil in the oil vessel (S2). Subsequently, at a step 3 (S3), the temperature detecting device detects the temperature of oil and outputs the result as an electric signal to the controller. The controller, based on the received signal, judges whether the temperature of oil reaches a cook-allowing temperature (designated temperature) corresponding to the sort of the foodstuffs (S4). Specifically, if in the step 4 (S4) the controller decides that the temperature of oil has reached the designated temperature (Y), the controller activates the lifting device to move the oil vessel to the upper position (S5). If the controller determines that the temperature of oil has not yet reached the designated temperature (N), the operation returns to the step 3 (S3) and the cooking oil is further heated and the temperature detecting means detects the temperature of oil.

Next, when the oil-vessel position detecting switch detects that the oil vessel has reached the upper position, a detected signal is sent out to the controller. Triggered by the detected signal, the controller starts measuring a time 't' (S6). The door opening/closing detecting device detects whether the door has been opened within a preset first time $t_1$ (S10). Specifically, if in the step 10 (S10) the time $t_1$ elapsed without any door-opening (Y), the controller causes an informing device to inform the user that the door has not been opened (S11). Further, the door opening/closing detecting device detects whether the door has been opened within a preset second time $t_2$ ($t_2 > t_1$) from the start of measuring time (S7). That is, if in the step 7 (S7) no door-opening is detected by the door opening/closing detecting device within the second time $t_2$ (Y), the controller determines that the user has forgotten the use of the apparatus and instructs the magnetron to stop heating (S8) to complete the heat-cooking (S9).

The controller controls the magnetron to maintain the oil at the designated temperature until the user opens the door to insert foodstuffs (S12). In a step 13 (S13), if the door opening/closing detecting device detects door-opening within the first time $t_1$ or within the second time $t_2$ and outputs the detection to the controller (Y), the controller instructs the magnetron to stop heating (S14). In the step 13 (S13), if the door opening/closing detecting device does not detect any door-opening within the first time $t_1$ or within the second time $t_2$ (N), the Operation returns to the step 6 (S6), and the controller measures the passage of time continuously while controlling magnetron to maintain the oil at the designated temperature. The above control is, of course, started after the oil vessel reaches the upper position but also is effected in the same manner after a final door-closing. This makes it possible for the apparatus to reliably avoid the risk of failure to turn the power off due to the user's forgetting the use.

Figure 14:
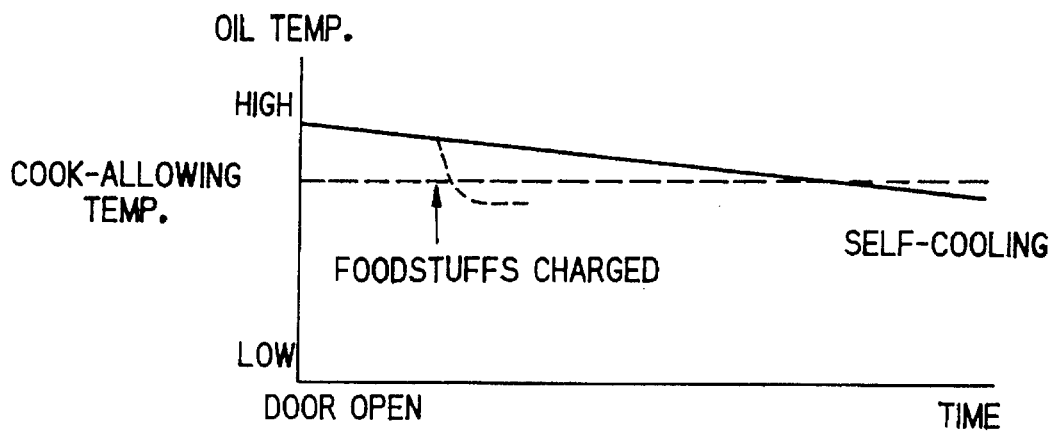
FIG. 14 is a chart showing variations of oil temperature with the passage of time after the door of a microwave fryer of the invention is opened.
Figure 15:
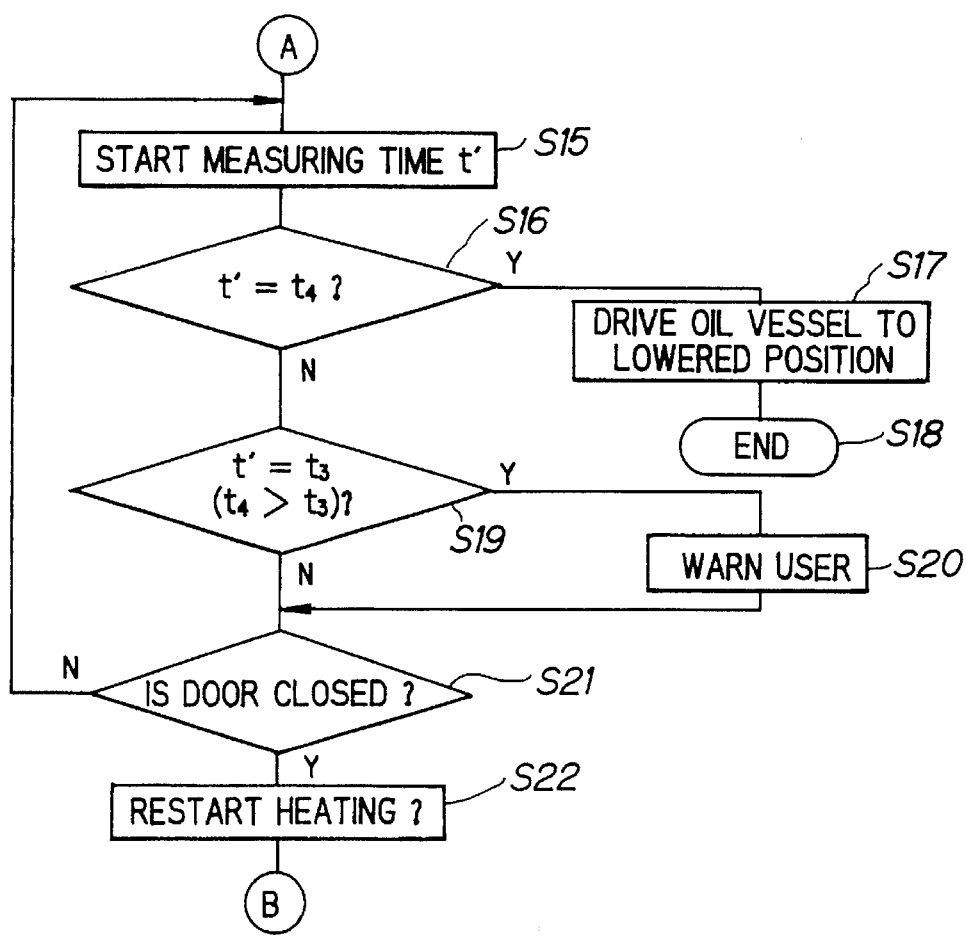
FIG. 15 is a flowchart illustrating a controlling example of a microwave fryer of the present invention in a case where the user has forgotten the use of the apparatus leaving the door open.

FIG. 14 is a chart showing variations in temperature of oil with the passage of time after the door of a microwave fryer of the invention is opened. FIG. 15 is a flowchart illustrating a controlling example of the microwave fryer of the invention in a case where the user has forgotten the use of the apparatus, leaving the door open. As is apparent from FIG. 14, if the apparatus has been left with the door open, the oil is gradually self-cooled with the passage of time and the temperature of oil is lowered before long to a temperature at which frying operation is not allowable. To deal with this, immediately after the heating is halted at the step 14 (S14) in FIG. 13, the controller restarts to measure a time "t'"

(S15). The door opening/closing detecting device detects whether the door has been closed within a preset third time $t_3$ and sends out a detected signal to the controller (S19). That is, if in the step 19 (S19) the third time $t_3$ has elapsed without the door closed (Y), the controller decides the condition as the user's forgetting the use of the apparatus and causes the informing device to warn the user of the failure of closing the door (S20). Then, the door opening/closing detecting device detects whether the door has been closed within a preset fourth time $t_4$ ($t_4 < t_3$) from the restart of measuring time (S16). That is, if in the step 16 (S16) the door opening/closing detecting device does not detect any door-closing within the fourth time $t_4$ (Y), the controller determines that even the aforementioned warning has not been able to notify the user of the forgetting situation and instructs the lifting device to move the oil vessel down to the lowered position (S17) and completes the heat-cooking operation (S18).

Then, in a step 21 (S21), when the door opening/closing detecting device detects door-closing within the third time $t_3$ or within the fourth time $t_4$ and inputs the detected result into the controller (Y), the Controller instructs the magnetron to restart heating (S22) and the operation is made to return to the step 6 (S6). This makes it possible for the apparatus to reliably avoid the risk of failure to turn the power off due to the user's forgetting the use. In the step 21 (S21), if the door opening/closing detecting device does not detect any door-closing within the third time $t_3$ or within the fourth time $t_4$ (N), the operation returns to the step 15 ( S15 ), and the controller measures the passage of time "t'" continuously while the door opening/closing detecting device keeps on detecting whether the door is closed and sending out the detected to the controller.

Figure 16:
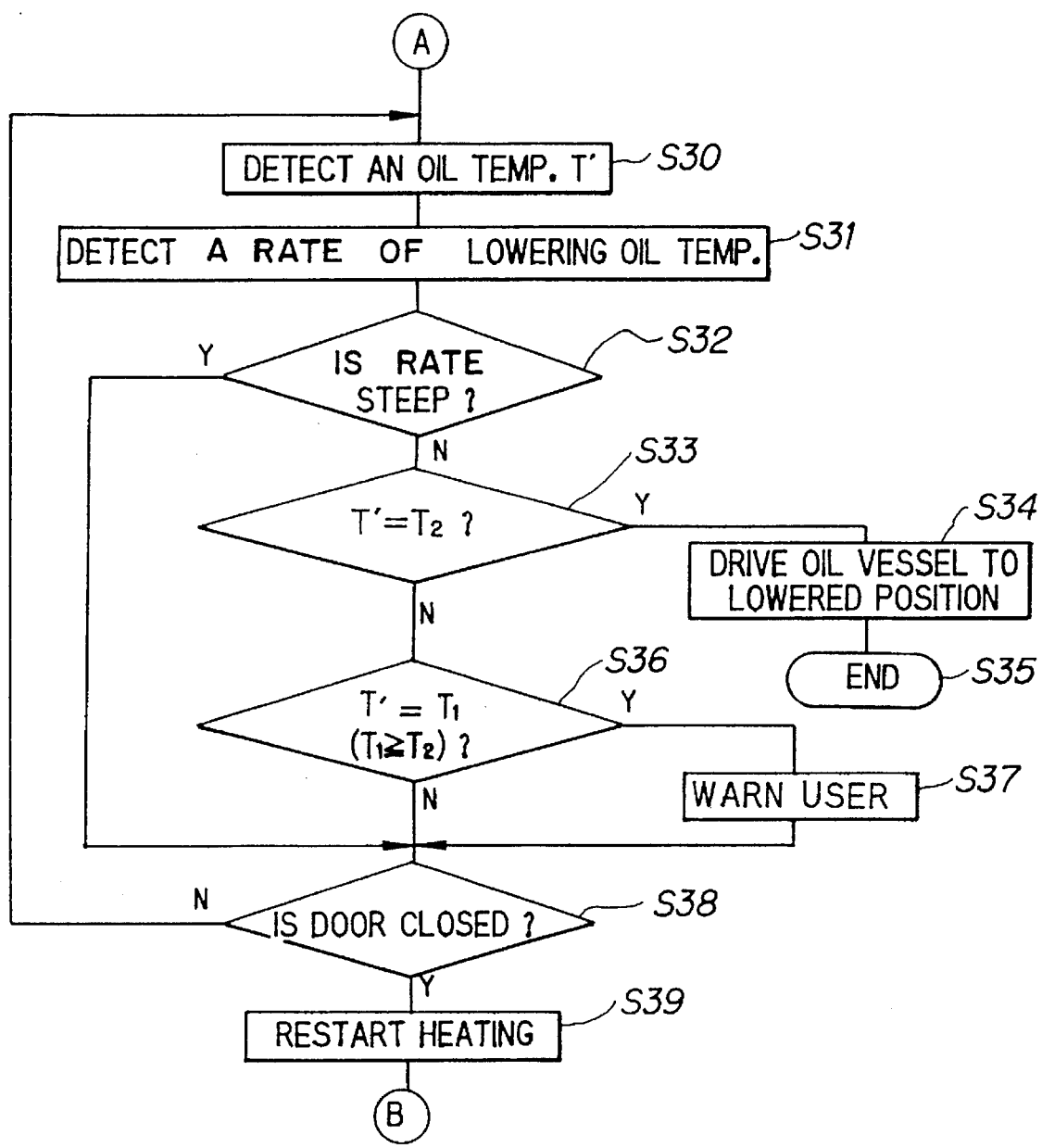
FIG. 16 is a flowchart illustrating another controlling example of a microwave fryer of the present invention in a case where the user has forgotten the use of the apparatus leaving the door open.

FIG. 16 is a flowchart illustrating another controlling example of the microwave fryer of the invention in a case where the user has forgotten the use of the apparatus leaving the door open. Hence, the steps 15 (S15) to 22 (S22) of the above controlling example can be replaced with steps 30 (S30) to 39 (S39) of this controlling example. In this controlling example, the temperature of oil is monitored while the door is open and if the temperature of oil lowers to a predetermined level, the system determines it as the user's forgetting the use and gives warning.

This controlling example will be described with reference to the flowchart. Immediately after the heating is halted at the step 14 (S14) in FIG. 13, the temperature detecting device detects a temperature T' of oil and inputs it into the controller (S30) as shown in FIG. 16. Here, when the door is opened and consequently the heating is halted, the temperature of oil gradually lowers as shown in FIG. 14. In such a case, behaviors of the oil-temperature differ depending upon situations. That is, the lowering of the oil-temperature differs between a case where the oil is self-cooled and a case where the oil is cooled by foodstuffs inserted. To distinguish the cases, the controller calculates a rate or an inclination of lowering oil-temperature based on the aforementioned input signal (S31) and determines whether the calculated rate of inclination of lowering oil-temperature is attributed to self-cooling or foodstuffs inserted (S32).

In the step 32 (S32), if the calculated inclination or rate of lowering oil-temperature is smaller than a preset inclination or rate of lowering oil-temperature (N), the controller determines that the lowering of oil-temperature is attributed to self-cooling and the operation goes to a step 36 (S36), where the temperature detecting device detects whether the oil-temperature T' has reduced to a preset first temperature $T_1$. In the step 36 (S36), if the temperature detecting device detects that the oil-temperature T' has reached the first temperature $T_1$ (Y), the controller determines the condition as the user's forgetting and warns the user of the user's forgetfulness through the informing device (S37). The temperature detecting device further determines whether the oil-temperature T' has been reduced to a preset second temperature $T_2$ ($T_2 \leq T_1$) (S33). That is, if in the step 33 (S33) the temperature detecting device detects that the oil-temperature T' has reached the preset second temperature $T_2$ (Y), the controller determines that even the aforementioned warning has not been able to notify the user of the forgetting situation and instructs the lifting device to move the oil vessel down to the lowered position (S34) and ends the heat-cooking operation (S35).

Then, in a step 38 (S38), when the door opening/closing detecting device detects door-closing and inputs the detected result into the controller before the oil-temperature T' lowers to the first temperature $T_1$ or second temperature $T_2$ (Y), the controller instructs the magnetron to restart heating (S39) and the operation is made to return to the step 6 (S6). This makes it possible for the apparatus to reliably avoid the risk of failure to turn the power off due to the user's forgetting the use. In the step 32 (S32), if the controller determines that the calculated rate of inclination of lowering oil-temperature is greater than the preset rate of inclination of lowering oil-temperature (Y) or the lowering of the oil-temperature is attributed to charging of foodstuffs, the operation goes to the step 38 (S38) and the controller, neither warning the user nor driving the oil vessel to the lowered position, instructs the lifting device to keep the oil vessel in the upper position and in the cooking-allowable state. Here, in the step 38 (S38), the door opening/closing detecting does not detect any door-closing before the oil-temperature T' lower to the first temperature $T_1$ or the second temperature $T_2$ (N), the operation returns to the step 30 (S30) from where the temperature detecting device continuously detects the oil temperature T' and then the controller makes a comparison of the detected oil-temperature T' with the first temperature $T_1$ or the second temperature $T_2$.

In the above description of the embodiment, although two methods of controlling examples of the microwave fryer in the case where the user has forgotten the use of the apparatus leaving the door open, that is, the control based on the measurement of time and the control based on the measurement of temperatures, are explained separately, these methods may be used in combination. For example, the apparatus can be controlled by using temperatures before warning and thereafter using the measurement of time for moving the oil vessel. Application of the above-described control is not limited to the microwave-heating fryer but can, of course, be applied to any fryers using other heating sources as long as the fryer has a door with a door opening/closing detecting device.

Figure 17:
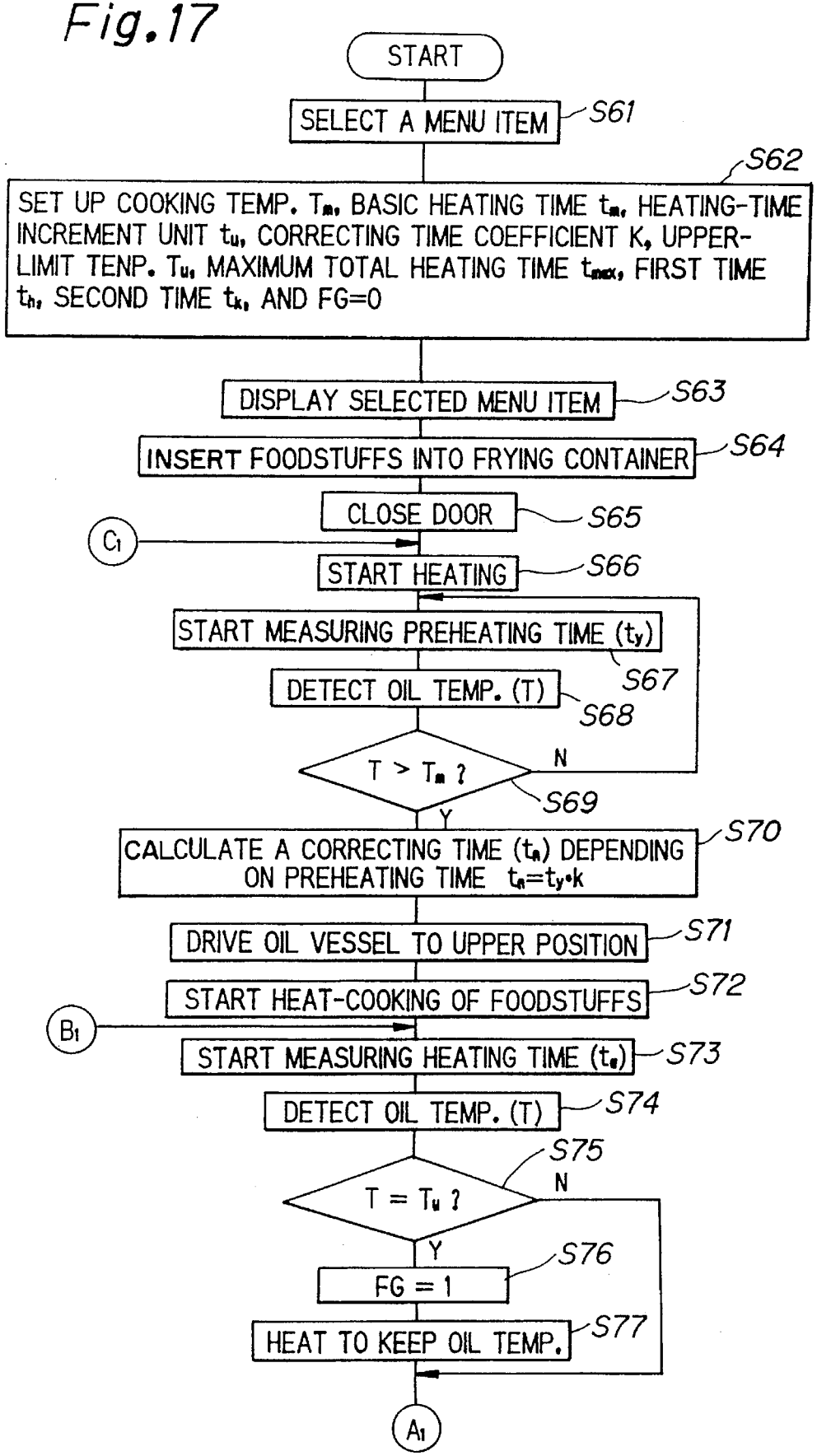
FIG. 17 is a flowchart illustrating a controlling example of an automatic operation of cooking in a microwave fryer of the present invention.
Figure 18:
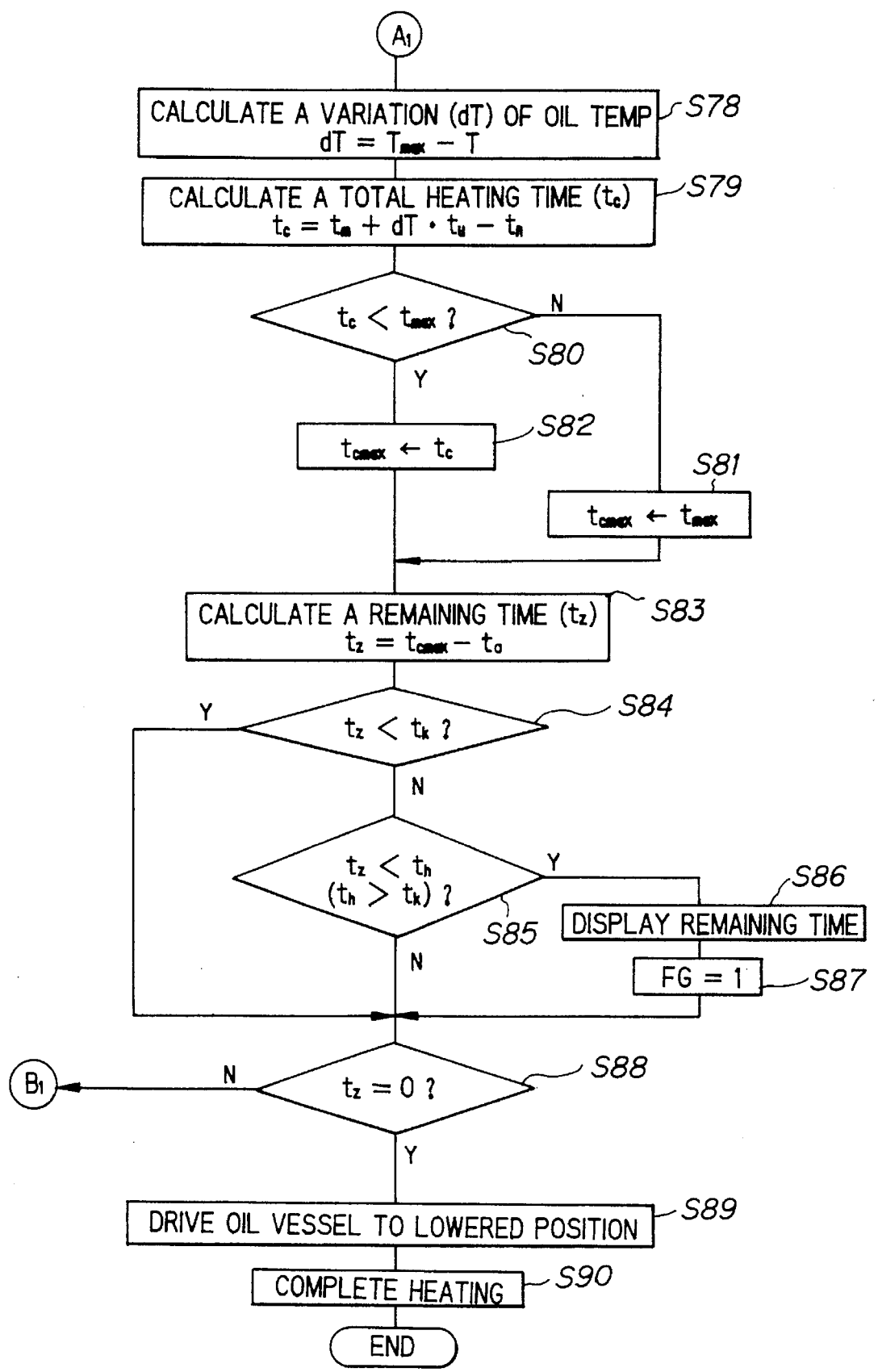
FIG. 18 is a flowchart showing a subsequent operation following the flowchart shown in FIG. 17.

The automatic cooking in the microwave fryer will be detailed. FIG. 17 is a flowchart illustrating a controlling example of the automatic cooking operation in the microwave fryer of the invention. FIG. 18 is a flowchart showing a subsequent operation following the flowchart shown in FIG. 17.

In FIG. 17, the user initially selects a food item to be cooked from the menu via plural keys (S61). At this moment, the oil vessel is stationed in the lowered position. Responding to the key input, the controller sets up in conformity with the selected item of the menu a cooking temperature $T_m$, a basic heating-time $t_m$, a heating-time increment unit $t_u$, a correcting time coefficient K, an upper-limit temperature $T_u$, a maximum total heating-time $t_{max}$, a first time $t_h$ and a second time $t^k$ ($t_{k<th}$) and sets a flag FG=0 (S62) while the displaying portion displays the name of the item selected via the key input or the item number (for example A-1) as well as a heating time etc., in association with the selected iter (S63).

Subsequently, the user opens the door of the fryer and puts the foodstuffs into the basket (S64) and closes the door, whereby the heat-cooking operation becomes ready (S65). Since the oil vessel occupies the lowered position at the moment, the foodstuffs have not yet been immersed in the cooking oil. After the door is closed in the step 65 (S65), as a signal to start the heating is inputted through the keys, the cooking oil held in the oil vessel stationed in the lowered position is preheated up to the cooking temperature $T_m$ (S66). As soon as the heating starts in the step 66 (S66), the controller starts to measure a preheating time $t_y$ (S67). During the preheating, the temperature detecting device detects the oil-temperature T and outputs a signal as to the detected temperature to the controller (S68). Based on the oil-temperature T the controller judges whether the oil temperature T is higher than the cooking temperature $T_m$ (S69). That is, if in the step 69 (S69) the controller determines that the oil temperature T is over the cooking temperature $T_m$ (Y), the controller calculates a correcting time $t_n$ from the preheating time $t_y$ (S70).

Now, the correcting time $t_n$ is explained hereinbelow. As stated above, during the preheating time until the temperature of the cooking oil in the oil vessel stationed in the lowered position reaches the cooking temperature $T_m$, the foodstuffs are left in the frying container. Further, as the temperature of the oil gradually increases, the foodstuffs in the frying container is heated to some extent by the convecting heat from the cooking oil. It has been empirically observed that a change in temperature of the cooking oil when the thus preheated foodstuffs is immersed into the oil as the oil vessel moves for frying, differs little from that when foodstuffs not undergoing the convecting heat is immersed into the oil for frying. However the difference between the processes is observable in the finished products. For example, when frozen foodstuffs heated by the convecting heat and therefore having somewhat higher surface temperatures are immersed in the oil, the temperature of oil is not lowered so greatly, but the finished color of the foodstuffs is greatly influenced. To deal with this, it is necessary to adjust the total heating-time by measuring the preheating time $t_y$ and calculating a correcting time $t_n$ as a function of $t_y$. The adjustment of the total heating-time will be detailed later. The correcting time $t_n$ is calculated as an expression as follows:

$$t_n = t_y \cdot K$$

where K is a correcting time coefficient.

Figure 19:
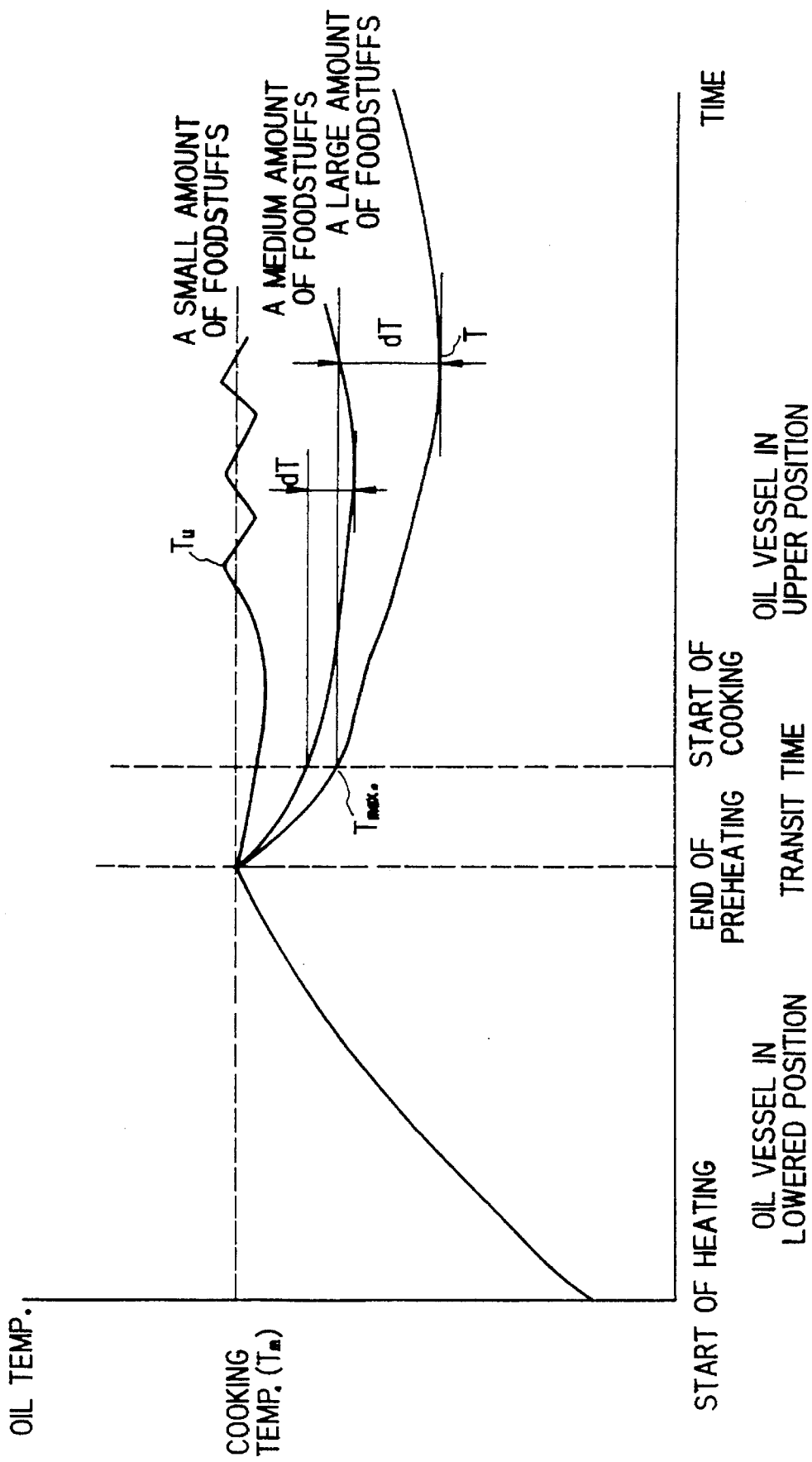
FIG. 19 is a chart showing variations in temperature of oil with the passage of time when a microwave fryer of the invention is operated in an automatic cooking mode; and, FIG. 20 is a flowchart showing another controlling example of an automatic operation in a microwave fryer of the invention up to a step of inputting foodstuffs.

The controller calculates the correcting time $t_n$ in the step 70 (S70), and then causes the lifting device to drive the oil vessel to the upper position (S71) and activates the heat-cooking of the foodstuffs (S72). At this moment, the temperature of oil sharply drops from the cooking temperature $T_m$ as shown in FIG. 19. This temperature drop depends on the amount of the foodstuffs inserted. Subsequently, the controller starts to measure an actual heat-cooking time $t_a$ simultaneously with the start of the heat-cooking (S73) while the temperature detecting device detects the oil temperature T and delivers the detection as an electric signal to the controller (S74). The controller judges whether the oil temperature T has reached the upper predetermined limited temperature $T_u$ (S75). That is, if in the step 75 (S75) the controller recognized that the oil temperature T has reached the upper-limit temperature $T_u$ (Y), the controller prohibits the renewal of heating-time while setting a renewal-prohibiting flag of total heating-time (or setting the FG value to be 1) (S76) and controls the microwave-heating device to a maintain the oil temperature at the cooking temperature (S77).

The aforementioned upper-limit temperature $T_u$ indicates an upper boundary required for maintaining the temperature of oil. Specifically, if the temperature of oil reaches the upper-limit, the heating is halted to restrain the temperature of oil from exceeding that value, and lowers the temperature. That is, once the operation of the heating means, enters the on/off mode to maintain the temperature of oil, the variations in temperature of oil do not involve any information on the quantity of foodstuffs and the operation can be controlled by the on/off switching of the heating device, independently of the quantity of foodstuffs. Therefore, in the present invention, an upper-limit temperature $T_u$ is previously set up and once the temperature of oil reaches the upper-limit temperature, no further renewal of total heating-time in association with the variations in temperature of oil is allowed. That is, control of heating is conclusively effected in a total heating-time designated at that time. As to total heating-time further description will be made hereinbelow.

As stated above, the lowering of the temperature of oil when and after the oil vessel has reached the upper position is continuously detected by the temperature detecting device and the detected result is successively delivered to the controller. The controller calculates a variation 'dT' of the temperature of oil based on the signal delivered (S78). Suppose that as shown in FIG. 19 a maximum temperature detected immediately after the start of frying is termed $t_{max}$ and a temperature of the cooking oil detected during the heat-cooking is termed T, the oil-temperature variation dT is calculated by the controller as follows:

$$dT = T_{max} - T.$$

Subsequently, the controller calculates a total heating-time $t_c$ using the oil-temperature variation dT determined at the step 78 (S78) as follows:

$$t_c = t_m + t_u \cdot dT.$$

When the correcting time $t_n$ determined at the step 70 (S70) is considered, the total heating-time $t_c$ can be written and calculated as follows (S79):

$$t_c = t_m + t_u \cdot dT - t_n.$$

As is apparent from the above equation, the total heating-time increases as the temperature of oil lowers. Here, the basic heating-time $t_m$ is determined based on a heating time required for frying foodstuffs which have not been influenced by any convecting heat. The correcting time $t_n$ is subtracted to compensate for light but significant heating during the preheating whereby an optimal heating time is set up.

Next, the controller compare s the total heating-time $t_c$ determined at the step 79 (S79) with a previously set up maximum total heating-time $t_{max}$ and judges which is long or short (S80). That is if the controller determines that the total heating-time $t_c$ is longer than the maximum total heating-time $t_{max}$ (N), the controller selects the maximum total heating-time $t_{max}$ as a longest total heating-time $t_{cmax}$ to effect the frying operation with the time $t_{cmax}$ (S81). In contrast, when the controller determines that the total heating-time $t_c$ is shorter than the maximum total heating-time $t_{max}$ (Y), the controller selects the total heating-time $t_c$ as a longest total heating-time $t_{cmax}$ to effect the frying operation with the time $t_{cmax}$ (S82). Here, the maximum total heating-time $t_{max}$ is introduced based on the following reasons. That is, the required heating time is increased due to the temperature drop at the start of cooking as stated above, therefore if the controller misjudges any other abnormal reduction in temperature due to a malfunction of the temperature detecting device, the user's adding the oil in the course of cooking or any other reason as a normal temperature drop at the beginning, the heating time could become extremely long, thereby degrading safety. Restricting the total heating-time below the maximum total heating-time $t_{max}$ makes it possible to take measures against such malfunctions and the like. This maximum total heating-time should be determined as to be a time required for the fryer of the invention to properly fry foodstuffs when maximum quantity of foodstuffs are inserted.

As the controller measures the actual heating time $t_a$ during the operation of frying, the controller calculates a remaining time $t_z$ from the longest total heating-time $t_{cmax}$ determined in the step 81 (S81) or the step 82 (S82) and the actual heating time $t_a$ as follows (S83):

$$t_z = t_{cmax} - t_a.$$

The controller, then, compares the remaining time $t_z$ determined at the step 83 (S83) with the first time $t_h$ (S85). That is if in the step 85 (S85) the controller determines that the remaining time $t_z$ is shorter than the preset first time $t_h$ (Y), the controller instructs the display portion to change the display content from the item name or the item number to the remaining time (S86). After the switch of display, the controller prohibits the renewal of the total heating-time and sets a renewal-prohibiting flag of heating time (or sets the/value to be 1) (S87). This display notifies the user of the ending time of cooking. Since renewal of the remaining time due to the renewal of the total heating-time will not be made once it is displayed, there is no possibility of making the user hold an uneasy feeling due to the increase of the remaining time after it is displayed.

Further, the controller compares the remaining time $t_z$ with the preset second time $t_k$ ($t_k < t_h$) to determine which is long or short (S84). That is, if in the step 84 (S84) the controller determines that the remaining time $t_z$ is shorter than the second time $t_k$ (y), the operation, without changing the display into the remaining time display mode, goes into a step 88 where the controller judges whether the remaining time $t_z$ is equal to 0. In contrast, if in the step 84 the controller determines that the remaining time $t_z$ is longer than the second time $t_k$ (N), the operation goes into the step 85. If the total heating-time is renewed when the remaining time is about to reach the first time, the temperature of oil is determined as still tending to lower. Therefore, after the renewal of the total heating-time, if the remaining time is smaller than the first time during the second time, the display will not be changed. If in the step 88 (S88) the controller determines that the remaining time $t_z$ is equal to 0 (Y), the controller activates the lifting device to drive the oil vessel to the lowered position (S89) and completes the heat-cooking operation (S90). When in the step 88 (S88) the controller judges that the remaining time $t_z$ is still not equal to 0 (N), the operation returns to the step 73 (S73) and the controller measures the heating time $t_a$ continuously while the temperature detecting device detects the temperature of oil.

Next, consideration will be made on the convectiving heat influencing the cooking of fried foods. Some kinds of foodstuffs are subject to be affected by the convectining heat so that cooking of the fried foods might be largely influenced. For instance, in frying a croquette, a croquette is cooked in a good condition, or firm and crispy in its surface, if the croquette with its surface cool is directly immersed in the high-temperature oil. If the surface of the croquette is previously heated by the convectining heat to be softened, the food breaks into pieces when it is fried resulting insufficient cooking. Accordingly, foodstuffs of this king should be inserted into the frying container after the complete of the preheating. Hereinbelow, an embodiment will be described which is designed considering the influence of the convecting heating.

Figure 20:
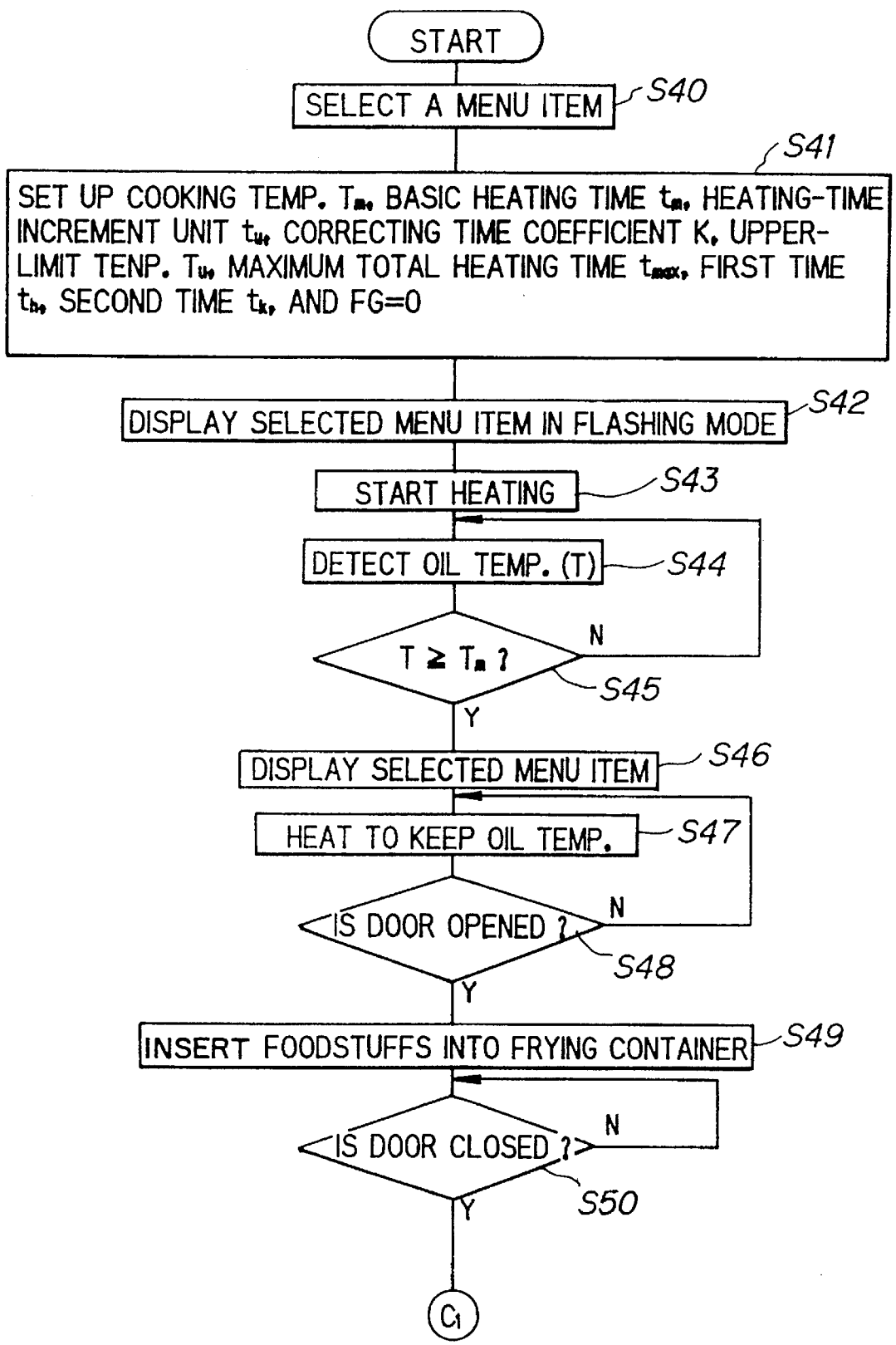

FIG. 20 is a flowchart showing another controlling example of effecting automatic operation in the microwave fryer of the invention up to a step of inserting foodstuffs. Hence, steps 40 (S40) to 50 (S50) of this embodiment may replace the steps 61 (S61) to 65 (S65) of the above controlling example shown in FIG. 17. This controlling example is designed by considering the influence of the convecting heating on foodstuffs.

The controlling example is explained with reference to the flowchart. The user initially selects a food item to be cooked from the menu via plural keys (S40). At this moment, the oil vessel is stationed in the lowered position. Responding to the key input, the controller sets up in conformity with the selected iter of the menu a cooking temperature $T_m$, a basic heating-time $t_m$, a heating-time increment unit $t_u$, a correcting-time coefficient K, an upper-limit temperature $T_u$, a maximum total heating-time $t_{max}$, a first time $t_h$ and a second time $t_k$ ($t_k < t_h$) and sets a flag FG=0 (S41) while the displaying portion flashes on and off the display of the name of the item selected via the key input or an item number (for example A-1) as well as a heating time etc., in association with the selected item (S42). This flashing display is able to clearly inform the user of the timing of inserting foodstuffs by prohibiting the user from inserting the foodstuffs into the frying container during the preheating.

As the user inputs a signal to start heating through the keys while the food item and the like are displayed flashing, the cooking oil held in the oil vessel stationed in the lowered position is preheated up to the cooking temperature $T_m$ (S43). During the preheating, the temperature detecting device detects the oil-temperature T (S44) and outputs a signal as to the detected temperature to the controller. Based on the oil-temperature T the controller judges whether the oil temperature T has reached the cooking temperature $T_m$ (S45). That is, if in the step 45 (S45) the controller determines that the oil temperature T has reached the cooking temperature $T_m$ (Y), the controller causes the displaying portion to continuously display the food item and the like (S46). This change of displaying mode notifies the user that the fryer is in a condition allowing foodstuffs to be inserted. If in the step 45 (S45) the controller determines that the oil temperature T has not yet reached the cooking temperature $T_m$ (N), the operation returns to the step 44 (S44) where the temperature detecting device continuously device detects the temperature of oil and outputs the detection to the controller.

As the temperature of oil reaches the cooking temperature, the controller control the magnetron so as to maintain the oil at the cooking temperature while the oil vessel is being stationed in the lowered position (S47). Subsequently, the door opening/closing detecting device detects whether the door is opened and inputs the detection to the controller (S48). If the controller determines that the door is opened (Y), the controller instructs the magnetron to stop heating and assumes that the foodstuffs are inserted into the basket (S49). In contrast, if in the step 48 (S48) the door opening/closing detecting device does not detect any door-opening (N), the operation returns to the step 47 (S47) where the controller continuously controls the magnetron so as to maintain the oil at the cooking temperature. Next, in a step 50 (S50) if the controller determines that the door opening/closing detecting device has detected door-closing (Y), the operation goes into the step 6 (S6) in FIG. 17 from where the same processes are performed. Since, in the control of this embodiment, the temperature of oil is already at the cooking temperature when foodstuffs are inserted, the preheating after the foodstuffs is inserted is not required or can be done in an extremely, short period of time. As a result, it is possible to eliminate the influence of the convecting heat on the foodstuffs whereby the fried food cain be finished in a good condition.

As has been apparent from the series of descriptions as to the configuration, operations as well as the controlling methods of the microwave fryer of the present invention with reference to the flowcharts, the present invention is effective as follows:

(1) Since the oil is radiated with microwaves and heated by the dielectric loss of the oil,i the oil is hard to degrade because the oil does not come in contact with any high-temperature portion (such as sheathed heater). Since the oil vessel is not equipped with any heating device, it is easy to clean the oil vessel as well as to attach and detach the oil vessel. This easy handling facilitates the microwave apparatus to be applied to other kinds of cooking.

Since radiation of microwaves hardly transmits through the frying container having foodstuffs contained when it is placed in the air, it is possible to prevent the foodstuffs from being heat-cooked with microwaves before the oil in the oil vessel reaches a setup temperature.

(2) By making the top opening of the frying container close to the ceiling of the heating chamber, it is possible to seal the radiation of microwaves without providing any microwave-sealing lid over the top opening of the frying container. It is easily possible to effect microwave- heating to only the oil while the foodstuffs are contained in the frying container. It is also easily possible to practice preheating of foodstuffs by placing the top opening of the frying container away from the ceiling of the heating chamber.

(3) Only closing the lidding body for allowing foodstuffs to be put in and out makes it possible to give microwave-heating to only the oil while foodstuffs are contained in the frying container. Since foodstuffs can be put in and out by only opening the lidding body, the handling is quite easy. Further, since the load for starting the driver motor can be reduced, it is possible to use a low-power driver motor thus making it possible to reduce the cost of the apparatus.

(4) Since the oil is heated to a desired temperature so that the temperature of the oil is higher than the atmospheric temperature over the oil surface, the temperature detector detects variations in temperature as the detector is moved in a predetermined length. The variation or varying manner becomes different depending on whether the quantity of oil is pertinent or not. Therefore, based on the variation of the detected temperatures before and after the movement, it is possible to determine whether the quantity of oil is acceptable and to control the apparatus based on the result. Specifically, if the oil quantity is unacceptable, the controller prohibits the continuation of cooking and warns the user of the situation.

(5) Since it takes a rather long time (a few seconds) to detect a second temperature stabilized after the movement from the first detection of temperature at the standard position, the heating power of the device during the detection is made low. By this operation it is possible to lessen the variation of the detecting temperatures due to the heat, whereby misjudgment of the suitability of the oil quantity can be averted.

Since the frying operation is regulated by prohibiting the continuation of cooking if the amount of oil is acceptable and warning the user of the situation, it is possible to avoid failures in frying or any other contingency.

(6) Since the temperature detector for detecting the temperature of the cooking oil in the oil vessel is composed of a first protecting tube made of metal for covering the thermosensitive element with a thermosensitive element at the front end therein and a second protecting tube made of metal for covering the first protecting tube, it is possible to prevent the concentration of electric fields on the tip of the first protecting tube during the heating operation. Hence, the output from the thermosensitive element always presents a value corresponding to the real oil temperature, thus allowing the temperature detector to measure the real oil temperature. Further, since the second protecting tube has an opening in the front end thereof, this structure promotes the variation of the oil-temperature to transfer quickly to the thermosensitive element. Therefore it is possible to improve the response of the thermosensitive element to variations of the oil temperature.

(7) Since the front end of the second protecting tube is projected out of the front end of the first protecting tube, this structure is able to effectively prevent the concentration of electric fields generated during heating upon the front end of the first protecting tube, whereby it is possible to eliminate the temperature-shift due to the concentration of electric fields.

(8) Since the side surface of the second protecting tube is perforated with a multiple number of small holes, variations of the oil-temperature can be transferred more quickly to the thermosensitive element. Therefore it is possible to further improve the response of the thermosensitive element to variations of the oil temperature.

(9) Since the second protecting tube is made electrically equipotential with the first protecting tube, it is possible to prevent discharge and the like between the two due to the high-frequency electric fields, whereby it is possible to control the deterioration of the reliability and detecting accuracy of the device.

(10) The oil vessel is stationed in the lower position at the start of heating so that foodstuffs held in the frying container are kept away from the cooking oil in the oil vessel. When the oil detecting device, as detecting that the temperature of the cooking oil has reached a previously designated temperature, outputs the detected result to the controller, the controller activates the lifting device to drive the oil vessel to the upper position and controls the microwave-heating device to maintain the temperature of the cooking oil in the oil vessel at the designated temperature after the oil vessel is stationed in the upper position. Accordingly, it is possible for the user to easily perform cooking by merely opening the door and putting foodstuffs in the frying container.

(11) As detecting that the oil vessel has reached the upper position, the oil-vessel position detecting device outputs the detected result to the controller. Immediately after receiving the signal, the controller starts measuring time. When the door opening/closing detecting device detects that the door has not been opened before the passage of the a preset first time $t_1$ and outputs the detected result to the controller, the controller causes the informing device to warn the user of the fact that the door has not been opened. When the door opening/closing detecting device detects that the door has not been opened before the passage of the a preset second time $t_2$ ($t_2>t_1$) and outputs the detected result to the controller, the controller instructs the microwave-heating device to stop heating. Therefore, it is possible to surely prevent the user from forgetting the use.

(12) The oil-vessel position detecting device, as detecting door-opening, outputs the detected result to the controller. Immediately after receiving the signal, the controller starts measuring time. When the door opening/closing detecting device detects that the door has not been closed before the passage of the a preset third time $t_3$ and outputs the detected result to the controller, the controller causes the informing device to warn the user of the fact that the door has not been closed. When the door opening/closing detecting device detects that the door has not been closed before the passage of the a preset fourth time $t_4$ ($t_4>t_3$) from the start of measuring time and outputs the detected result to the controller, the controller instructs the lifting device to move the oil vessel to the lowered position. Accordingly, it is possible to visually warn the user of the fact that the temperature of the oil is too low to effect cooking.

(13) When the door opening/closing detecting device, as detecting door-opening, outputs the detected result to the controller, the controller instruct the microwave-heating device to stop heating. Then, the temperature detecting device, as detecting that the temperature of the cooking oil has lowered to a preset first temperature $T_1$, outputs the detected result to the controller, the controller informs the user of the temperature lowering via the informing device. If the temperature detecting device, as detecting that the temperature of the cooking oil has lowered to a preset second temperature $T_2$ ($T_2<T_1$), outputs the detected result to the controller, the controller instructs the lifting device to drive the oil vessel to the lowered position. Accordingly, it is possible to visually warn the user of the fact that the temperature of the oil is too low to effect cooking.

(14) When the temperature detecting device, as detecting the temperature of the cooking oil, outputs the detected result to the controller, the controller calculates the inclination or rate of temperature lowering based on the received signal and determines that the calculated inclination or rate of temperature lowering is greater than a preset inclination or rate of temperature lowering, the controller, neither warning the user nor driving the oil vessel to the lowered position, instructs the lifting device to maintain the oil vessel at the upper position. Therefore, it is possible for the controller to judge whether the lowering of the oil temperature is attributed to self-cooling or foodstuffs inserted, whereby it is possible to more reliably prevent the user from forgetting the use of the apparatus.

(15) When the user selects an item from menu through a plurality of operating keys for menu-selection and activation of heating, the controller, in response with the selected item, sets up a cooking temperature $T_m$, a basic heating time $t_m$, a heating-time increment unit $t_u$ in association with a variation of the oil temperature. At the start of heating, the oil vessel is stationed in the lowered position so that foodstuffs held in the frying container are kept away from the cooking oil in the oil vessel. When the temperature detecting device, as detecting that the temperature of the cooking oil has reached the cooking temperature $T_m$, outputs the detected result to the controller, the controller activates the lifting device to move the oil vessel to the upper position and controls the microwave-heating device to maintain the cooking oil at the cooking temperature $T_m$. Then, a total heating-time $t_c$ is determined by using a variation of the oil-temperature dT calculated from a maximum temperature detected by the temperature detecting device after the start of frying and a temperature of the cooking oil detected during the heat-cooking. Accordingly, it is possible to set up an optimal heating-time in conformity with the amount of foodstuffs when an automatic heat-cooking operation is to be made.

(16) The controller measures a preheating time $t_y$ until the temperature of the cooking oil reaches the cooking temperature $T_m$ and calculates a correcting time. Based on the correcting time, the controller determines a the total heating-time. Accordingly, it is possible to set up a further optimal heating-time with some heat-influence during the preheating estimated.

(17) The controller also sets up an upper-limit temperature $T_u$ of the oil temperature at the time of selecting an item from the menu. When the temperature detecting device detects that the oil-temperature has reached the upper-limit temperature $T_u$ after the start of heat-cooking and outputs the detected result to the controller, the controller prohibits renewal of the total heating-time $t_c$. Therefore, excessive elevation of the oil temperature over the upper-limit temperature can be restricted to thereby realize established safety as well as to optimize the total heating-time.

(18) The controller also sets up a first time $t_h$ at the time of selecting an item from the menu, and when the controller recognized that a remaining time $t_z$, calculated by a subtraction of an actual heating time $t_a$ which is measured by the controller from the total heating-time $t_c$, is shorter than the first time $t_h$, the controller instructs the displaying portion to display the remaining time and prohibits renewal of the total heating-time $t_c$. As a result, it is possible to notify the user of the ending time of cooking. Since renewal of the remaining time due to the renewal of the total heating-time will not be made once it is displayed, there is no possibility of making the user hold uneasy feeling due to the increase of the remaining time after it is displayed.

(19) The controller also sets up a second time $t_k$ at the time of selecting an item from the menu, and when the controller recognized that a remaining time $t_z$, calculated by a subtraction of an actual heating-time $t_a$ which is measured by the controller from the total heating-time $t_c$ is shorter than the second time $t_k$, the controller prohibits the displaying portion from displaying the remaining time. Therefore, the user is able to understand that the cooking operation is in a final stage immediately before end.

(20) The controller prohibits the user from inserting foodstuffs into the frying container during the preheating until the temperature of the cooking oil held in the oil vessel stationed in the lowered position reaches the cooking temperature $T_m$. When the temperature of the cooking oil has reached the cooking temperature $T_m$, the controller permits the user to insert foodstuffs into the frying container and controls the oil vessel to be stationed in the lowered position and the microwave-heating device to maintain the cooking oil at the cooking temperature $T_m$ until the door is opened. After the foodstuffs are inserted into the frying container and the door is closed, the controller controls the oil vessel to be stationed in the lowered position and the microwave-heating device to reenter the preheating mode. Therefore, it is possible to automatically heat-cook foodstuffs in a good finished condition even if the foodstuffs used are subject to be affected by convecting heat.

(21) Since the controller instructs the displaying portion to display that the apparatus is in a state allowing the user to insert foodstuffs into the frying container, it is possible for the apparatus to surely notify the user of the timing of inserting foodstuffs which are subject to be affected by convecting heat, whereby it is possible to even further improve the heat-cooking.

What is claimed is:

1. A microwave fryer comprising:

a heating chamber;

an oil vessel, disposed inside said heating chamber, holding a cooking oil;

a frying container, disposed in said heating chamber, holding foodstuffs;

a door for opening and closing a portion of said heating chamber, the door closing the portion of the heating chamber subsequent to foodstuffs being placed into the frying container and prior to the frying container being immersed in the cooking oil;

lifting means for moving one of said frying container and said oil vessel relative to the other;

microwave-heating means for heating the cooking oil in said oil vessel with irradiation of microwaves; and temperature detecting means for detecting a temperature of the cooking oil, the lifting means moving one of said frying container and said oil vessel relative to the other, to immerse the frying container in the cooking oil, upon the temperature detecting means detecting that the cooking oil has reached a predetermined temperature.

2. A microwave fryer according to claim 1 wherein said frying container includes a screen portion which permits microwaves to transmit therethrough when the frying container is immersed in the cooking oil and which prohibits most of the microwaves from transmitting therethrough when the frying container is not immersed in the cooking oil.

3. A microwave fryer comprising:

a heating chamber;

an oil vessel, disposed inside said heating chamber, holding a cooking oil;

a frying container, disposed in said heating chamber, for holding foodstuffs;

a door for opening and closing a portion of said heating chamber, the door closing the portion of the heating chamber subsequent to foodstuffs being placed into the frying container and prior to the frying container being immersed in the cooking oil;

lifting means for moving one of said frying container and said oil vessel relative to the other;

microwave-heating means for heating the cooking oil in said oil vessel with irradiation of microwaves;

temperature detecting means for detecting the temperature of the cooking oil;

movement control means for controlling the lifting means to move one of said oil vessel and said frying container, relative to the other, by a predetermined length so as to immerse said frying container into the cooking oil; and determining means for determining whether a quantity of the cooking oil is acceptable upon a predetermined relationship between a first temperature, detected by the temperature detecting means prior to the frying container being immersed in the cooking oil, and a second temperature, detected by the temperature detecting means after one of said oil vessel and said frying container is moved relative to the other by the predetermined length, being satisfied.

4. The microwave fryer of claim 3, wherein the determining means determines that the quantity of oil is acceptable upon a difference between the first temperature and the second temperature being greater than a predetermined temperature difference.

5. A microwave fryer according to claim 3, further comprising a heating-means controlling means for prohibiting operation of said heating means upon detecting said first temperature, until detection of the second temperature.

6. A microwave fryer according to claim 3 further comprising,
   means for performing at least one of prohibiting operation of the heating means and warning a user that the quantity of oil in the oil vessel is unacceptable, upon said determining means failing to determine that the quantity of oil in the oil vessel is acceptable.

7. The microwave fryer of claim 6, wherein the determining means determines that the quantity of oil is unacceptable upon a difference between the first temperature and the second temperature being less than a predetermined temperature difference.

8. A microwave fryer comprising:
   a heating chamber;
   an oil vessel, disposed inside said heating chamber, holding a cooking oil;
   a frying container, disposed in said heating chamber, for holding foodstuffs;
   a door for opening and closing a portion of said heating chamber, the door closing the portion of the heating chamber subsequent to foodstuffs being placed into the frying container and prior to the frying container being immersed in the cooking oil;
   lifting means for moving one of said frying container and said oil vessel relative to the other;
   microwave-heating means for heating the cooking oil in said oil vessel with irradiation of microwaves;
   temperature detecting means for detecting a temperature of the cooking oil, the lifting means moving one of said frying container and said oil vessel relative to the other to immerse the frying container in the cooking oil, upon the temperature detecting means detecting that the cooking oil temperature has reached a predetermined temperature; and
   a controller for controlling said microwave-heating means to heat the cooking oil to a temperature within a predetermined range, as detected by the said temperature detecting means,
   said temperature detecting means including,
      a thermosensitive element,
      a first protecting tube made of metal for covering said thermosensitive element, and
      a second protecting tube made of metal for covering said first protecting tube, the second protecting tube including an opening at a front end wherein said second protecting tube is disposed such that the front end thereof is at least flush with a front end of said first protecting tube.

9. A microwave fryer according to claim 8, wherein a side surface of said second protecting tube is perforated with a plurality of holes.

10. A microwave fryer according to claim 9, wherein said second protecting tube is electrically equipotential with said first protecting tube.

11. The microwave fryer of claim 9, wherein a diameter of each of the holes is within a range of 1–5 mm.

12. A microwave fryer according to claim 8, wherein said second protecting tube is electrically equipotential with said first protecting tube.

13. A microwave fryer comprising:
   a heating chamber;
   an oil vessel, disposed inside said heating chamber, holding a cooking oil;
   a frying container, disposed in said heating chamber, for holding foodstuffs;
   a door for opening and closing a portion of said heating chamber, the door closing the portion of the heating chamber subsequent to foodstuffs being placed into the frying container and prior to the frying container being immersed into the cooking oil;
   microwave-heating means for heating the cooking oil in said oil vessel with irradiation of microwaves;
   temperature detecting means for detecting a temperature of the cooking oil;
   a controller, receiving an electric signal representing a temperature detected by said temperature detecting means, for controlling said microwave-heating means based on the received electric signal;
   lifting means for raising said oil vessel up and for lowering said oil vessel down; and
   oil vessel position detecting means for detecting raised and lowered positions of said oil vessel, wherein
   at the beginning of heating, said oil vessel is in a predetermined lowered position so that foodstuffs placed into said frying container are above the cooking oil in said oil vessel, and, when said temperature detecting means detects that the temperature of the cooking oil has reached a predetermined temperature and the corresponding electric signal is received by said controller, said controller activates said lifting means to raise said oil vessel to a predetermined raised position to immerse the frying container in the cooking oil and controls said microwave-heating means to maintain the cooking oil in said oil vessel at the predetermined temperature.

14. A microwave fryer comprising:
   a heating chamber;
   an oil vessel, disposed inside said heating chamber, holding a cooking oil;
   a frying container, disposed in said heating chamber, for holding foodstuffs;
   a door for opening and closing a portion of said heating chamber;
   a door opening/closing detecting means for detecting opening and closing of the door;
   microwave-heating means for heating the cooking oil in said oil vessel with irradiation of microwaves;
   temperature detecting means for detecting a temperature of the cooking oil;
   a controller, receiving an electric signal representings a temperature detected by said temperature detecting means, for controlling said microwave-heating means based on the received electric signal;
   lifting means for raising said oil vessel up and for lowering said oil vessel down; and
   oil vessel position detecting means for detecting raised and lowered positions of said oil vessel, wherein,
   immediately after said oil vessel position detecting means detects that said oil vessel has reached a predetermined raised position and outputs the detected result to said controller, said controller begins to measure elapsed time, and when said door opening/closing detecting means detects that said door has not been opened for a preset first time $t_1$ and outputs the detected result to said controller, said controller informs the user that said door has not been opened via an informing device, and when said door opening/closing detecting means detects that said door has not been opened for a preset second time $t_2$, wherein $t_2$ is greater than $t_1$, and outputs the detected result to said controller, said controller instructs said microwave-heating means to stop heating the cooking oil.

15. A microwave fryer comprising:

a heating chamber;

an oil vessel, disposed inside said heating chamber, holding a cooking oil;

a frying container disposed in said heating chamber, for holding foodstuffs;

a door for opening and closing a portion of said heating chamber;

a door opening/closing detecting means for detecting opening and closing of the door;

microwave-heating means for heating the cooking oil in said oil vessel with irradiation of microwaves;

temperature detecting means for detecting a temperature of the cooking oil;

a controller, receiving an electric signal representing a temperature detected by said temperature detecting means, for controlling said microwave-heating means based on the received electric signal;

lifting means for raising said oil vessel up and for lowering said oil vessel down; and oil vessel position detecting means for detecting raised and lowered positions of said oil vessel, wherein, immediately after said door opening/closing detecting means detects that said door is opened and outputs the detected result to said controller, said controller begins to measure elapsed time, and when said door opening/ closing detecting means detects that said door has not been closed for a preset first time $t_3$ and outputs the detected result to said controller, said controller informs the user that said door has not been closed via an informing device, and when said door opening/ closing detecting means detects that said door has not been closed for a preset second time $t_4$, wherein $t_4$ is greater than $t_3$, and outputs the detected result to said controller, said controller instructs said lifting means to lower said oil vessel to a predetermined lowered position.

16. A microwave fryer comprising:

a heating chamber;

an oil vessel, disposed inside said heating chamber, holding a cooking oil;

a frying container, disposed in said heating chamber, for holding foodstuffs;

a door for opening and closing a portion of said heating chamber, the door closing the portion of the heating chamber subsequent to foodstuffs being placed into the frying container and prior to the frying container being immersed in the cooking oil;

a door opening/closing detecting means for detecting opening and closing of the door;

microwave-heating means for heating the cooking oil in said oil vessel with irradiation of microwaves;

temperature detecting means for detecting a temperature of the cooking oil;

a controller, receiving an electric signal representing a temperature detected by said temperature detecting means, for controlling said microwave-heating means based on the received electric signal;

lifting means for raising said oil vessel up and for lowering said oil vessel down; and oil-vessel position detecting means for detecting raised and lowered positions of said oil vessel, wherein when said door opening/closing detecting means detects that said door is opened and outputs the detected result to said controller, said controller instructs said microwave-heating means to stop heating the cooking oil, and when said temperature detecting means detects that the temperature of the cooking oil has decreased to a predetermined first temperature $T_1$ and outputs the detected result to said controller, said controller informs the user of the temperature lowering via an informing device, and when said temperature detecting means detects that the temperature of the cooking oil has decreased to a predetermined second temperature $T_2$, where $T_2$ is less than or equal to $T_1$, and outputs the detected result to said controller, said controller instructs said lifting means to lower said oil vessel to a predetermined lowered position.

17. The microwave fryer of claim 16, wherein the temperature detecting means detects the temperature of the cooking oil and outputs a signal indicative of the temperature to the controller, and said controller calculates a rate of decreasing temperature of the cooking oil based on the signal received from the temperature detecting means, and only upon said controller determining that the calculated rate of decreasing temperature is less than a predetermined rate of temperature decrease, does the temperature detecting means detect that the temperature has decreased to the first predetermined temperature $T_1$ or the second predetermined temperature $T_2$.

18. A microwave fryer according to claim 16, wherein said temperature detecting means detects the temperature of the cooking oil and outputs a signal indicative of the temperature to said controller, said controller calculates a rate of decreasing temperature of the cooking oil based on the signal received from said temperature detecting means, and when said controller determines that the calculated rate of decreasing temperature is greater than a predetermined rate of temperature decrease, said controller instructs said lifting means to maintain the oil vessel in a predetermined upper position, and neither informs the user nor instructs the lowering of said oil vessel to the predetermined lowered position.

19. A microwave fryer comprising:

a heating chamber;

an oil vessel, disposed inside said heating chamber, holding a cooking oil;

a frying container, disposed in said heating chamber, for holding foodstuffs;

a door for opening and closing a portion of said heating chamber, the door closing the portion of the heating chamber subsequent to foodstuffs being placed into the frying container and prior to the frying container being immersed in the cooking oil;

door opening/closing detecting means for detecting opening and closing of the door;

microwave-heating means for heating the cooking oil in said oil vessel with irradiation of microwaves;

temperature detecting means for detecting the temperature of the cooking oil;

a controller, receiving an electric signal representing a temperature detected by said temperature detecting means, for controlling said microwave-heating means based on the received electric signal;

lifting means for raising said oil vessel up and for lowering said oil vessel down;

oil vessel position detecting means for detecting raised and lowered positions of said oil vessel;

a plurality of keys for selecting an item from a menu and for instructing the microwave-heating means to begin heating the cooking oil; and a displaying portion for displaying at least one of an item selected from the menu and a heating time, wherein, when an item is selected from the menu via said keys, said controller, in association with the selected item, establishes a cooking temperature $T_m$, a basic heating time $t_m$ and a heating-time increment unit $t_u$, and, at the beginning of heating by the microwave-heating means, said oil vessel is in a predetermined lowered position so that foodstuffs held in said frying container are not immersed in the cooking oil of said oil vessel, and when said temperature detecting means detects that the temperature of the cooking oil has reached the cooking temperature $T_m$ and outputs the detected result to said controller, said controller controls said lifting means to raise said oil vessel to a predetermined upper position, controls said microwave-heating means to maintain the cooking oil at the cooking temperature $T_m$ and calculates an oil-temperature variation dT as follows:

$$dT = T_{max} - T,$$

wherein $T_{max}$ is a maximum temperature detected after the beginning of heating of the cooking oil and T is a temperature of the cooking oil detected during the heat-cooking, said controller further calculating a total heating-time $t_c$ as follows:

$$t_c = t_m + t_u \cdot dT,$$

to thereby control the heat-cooking operation during the calculated total heating-time $t_c$.

20. A microwave fryer according to claim 19, wherein said controller also establishes an upper-limit temperature $T_u$ of the oil temperature subsequent to selecting of an item from the menu, and when said temperature detecting means detects that the oil-temperature has reached the established upper-limit temperature $T_u$ after the beginning of heat-cooking and outputs the detected result to said controller, said controller prohibits renewal of the total heating-time $t_c$.

21. A microwave fryer according to claim 19, wherein said controller also establishes a first time $t_h$ subsequent to selecting of an item from the menu, and when said controller recognizes that a remaining time $t_z$, calculated by a subtraction of an actual heating time $t_a$ measured by said controller from the total heating-time $t_c$, is shorter than the established first time $t_h$, said controller instructs said displaying portion to display the remaining time $t_z$ and prohibits renewal of the total heating-time $t_c$.

22. A microwave fryer according to claim 21, wherein said controller also establishes a second time $t_k$ subsequent to selecting of an item from the menu, and when said controller recognizes that a remaining time $t_z$, calculated by a subtraction of an actual heating time $t_a$ measured by said controller from the total heating-time $t_c$, is shorter than the established second time $t_k$, said controller prohibits said displaying portion from displaying the remaining time $t_z$.

23. A microwave fryer according to claim 19, wherein said controller measures a preheating time $t_y$ from the beginning of heating of the cooking oil until the temperature of the cooking oil reaches the cooking temperature $T_m$, and calculates a correcting time $t_n$, using a predetermined correcting time coefficient K, as follows:

$$t_n = t_y \cdot K,$$

whereby the total heating-time $t_c$ is corrected formula as follows:

$$t_c = t_m + t_u \cdot dT - t_n.$$

24. A microwave fryer according to claim 23, wherein said controller prohibits input of foodstuffs into said frying container during the preheating until the temperature of the cooking oil held in said oil vessel in the predetermined lowered position reaches the established cooking temperature $T_m$, and when the temperature of the cooking oil reaches the established cooking temperature $T_m$, said controller permits input of foodstuffs into said frying container after the door is opened and controls said oil vessel to remain in the predetermined lowered position and said microwave-heating means to maintain the cooking oil at the established cooking temperature $T_m$ until said door is closed, and after the foodstuffs are input into said frying container and said door is closed, said controller controls said oil vessel to be raised to the predetermined upper position.

25. A microwave fryer according to claim 24 wherein said controller controls said displaying portion to display when foodstuffs are permitted to be input into said frying container.

26. A microwave fryer according to claim 23, wherein said controller also establishes a first time $t_h$ subsequent to selecting of an item from the menu, and when said controller recognizes that a remaining time $t_z$, calculated by a subtraction of an actual heating time $t_a$ measured by said controller from the total heating-time $t_c$, is shorter than the established first time $t_h$, said controller instructs said displaying portion to display the remaining time $t_z$ and prohibits renewal of the total heating-time $t_c$.

27. A microwave fryer according to claim 26, wherein said controller also establishes a second time $t_k$ subsequent to selecting of an item from the menu, and when said controller recognizes that a remaining time $t_z$, calculated by a subtraction of an actual heating time $t_a$ measured by said controller from the total heating-time $t_c$, is shorter than the established second time $t_k$, said controller prohibits said displaying portion from displaying the remaining time $t_z$.

28. A microwave fryer according to claim 23, wherein said controller also establishes an upper-limit temperature $T_u$ of the oil temperature subsequent to selecting of an item from the menu, and when said temperature detecting means detects that the oil-temperature has reached the established upper-limit temperature $T_u$ after the beginning of heat-cooking and outputs the detected result to said controller, said controller prohibits renewal of the total heating-time $t_c$.

* * * * *